United States Patent
Di Pietro et al.

(10) Patent No.: US 9,559,918 B2
(45) Date of Patent: Jan. 31, 2017

(54) GROUND TRUTH EVALUATION FOR VOTING OPTIMIZATION

(71) Applicant: Cisco Technology, Inc., San Jose, CA (US)

(72) Inventors: Andrea Di Pietro, Lausanne (CH); Jean-Philippe Vasseur, Saint Martin d'Uriage (FR); Javier Cruz Mota, Assens (CH)

(73) Assignee: Cisco Technology, Inc., San Jose, CA (US)

( * ) Notice: Subject to any disclaimer, the term of this patent is extended or adjusted under 35 U.S.C. 154(b) by 85 days.

(21) Appl. No.: 14/278,532

(22) Filed: May 15, 2014

(65) Prior Publication Data
US 2015/0334123 A1    Nov. 19, 2015

(51) Int. Cl.
| | |
|---|---|
| *G06F 11/00* | (2006.01) |
| *H04L 12/26* | (2006.01) |
| *H04L 29/06* | (2006.01) |
| *H04L 29/08* | (2006.01) |
| *H04L 12/24* | (2006.01) |

(52) U.S. Cl.
CPC .............. *H04L 43/04* (2013.01); *H04L 41/30* (2013.01); *H04L 63/1408* (2013.01); *H04L 63/1458* (2013.01); *H04L 67/04* (2013.01); *H04L 67/12* (2013.01); *H04L 2463/141* (2013.01)

(58) Field of Classification Search
CPC .. H04L 63/1408; H04L 63/1458; H04L 67/04; H04L 2463/141; H04L 63/1433; H04L 63/1441

USPC ...................................................... 726/22–25
See application file for complete search history.

(56) References Cited

U.S. PATENT DOCUMENTS

| | | | |
|---|---|---|---|
| 7,873,583 B2 | 1/2011 | Laxman et al. | |
| 8,069,216 B2* | 11/2011 | He ....................... | H04L 63/1416 370/241 |
| 8,504,504 B2 | 8/2013 | Liu | |
| 2004/0103058 A1 | 5/2004 | Hamilton | |
| 2005/0286772 A1 | 12/2005 | Albertelli | |

(Continued)

OTHER PUBLICATIONS

Dietterich, T. G., "Ensemble Methods in Machine Learning", Lecture Notes in Computer Science, vol. 1857, pp. 1-15, Springer Berlin Heidelberg.

(Continued)

*Primary Examiner* — Nirav B Patel
(74) *Attorney, Agent, or Firm* — Parker Ibrahim & Berg LLC; James M. Behmke; Stephen D. LeBarron

(57) ABSTRACT

In one embodiment, attack observations by a first node are provided to a user interface device regarding an attack detected by the node. Input from the user interface device is received that confirms that a particular attack observation by the first node indicates that the attack was detected correctly by the first node. Attack observations by one or more other nodes are provided to the user interface device. Input is received from the user interface device that confirms whether the attack observations by the first node and the attack observations by the one or more other nodes are both related to the attack. The one or more other nodes are identified as potential voters for the first node in a voting-based attack detection mechanism based on the attack observations from the first node and the one or more other nodes being related.

24 Claims, 17 Drawing Sheets

(56) References Cited

U.S. PATENT DOCUMENTS

| | | | |
|---|---|---|---|
| 2006/0004614 A1* | 1/2006 | Hutchinson | G06Q 10/0633 |
| | | | 705/7.27 |
| 2008/0083029 A1 | 4/2008 | Yeh et al. | |
| 2010/0100962 A1* | 4/2010 | Boren | H04L 63/1433 |
| | | | 726/25 |
| 2011/0083011 A1* | 4/2011 | DiCrescenzo | H04L 9/006 |
| | | | 713/158 |
| 2013/0010610 A1 | 1/2013 | Karthikeyan et al. | |
| 2013/0298184 A1 | 11/2013 | Ermagan et al. | |
| 2013/0305358 A1* | 11/2013 | Gathala | G06F 21/56 |
| | | | 726/22 |
| 2013/0335219 A1* | 12/2013 | Malkowski | G08B 13/22 |
| | | | 340/539.22 |

OTHER PUBLICATIONS

Gnawali, et al., "The Minimum Rank with Hysteresis Objective Function", Request for Comments 6719, Sep. 2012, 13 pages, Internet Engineering Task Force Trust.

Thubert, P., "Objective Function Zero for the Routing Protocol for Low-Power and Lossy Networks (RPL)", Request for Comments 6552, Mar. 2012, 14 pages, Internet Engineering Task Force Trust.

Vasseur, et al., "Routing Metrics Used for Path Calculation in Low-Power and Lossy Networks", Request for Comments 6551, Mar. 2012, 30 pages, Internet Engineering Task Force Trust.

Winter; et al., "RPL: IPv6 Routing Protocol for Low-Power and Lossy Networks", Request for Comments 6550, Mar. 2012, 157 pages, Internet Engineering Task Force Trust.

* cited by examiner

GROUND TRUTH EVALUATION FOR VOTING OPTIMIZATION

TECHNICAL FIELD

The present disclosure relates generally to computer networks, and, more particularly, to evaluating a ground truth for voting optimization in a network.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability of a device, etc. Changing environmental conditions may also affect device communications. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like also present unique challenges to LLNs.

One type of network attack that is of particular concern in the context of LLNs is a Denial of Service (DoS) attack. Typically, DoS attacks operate by attempting to exhaust the available resources of a service (e.g., bandwidth, memory, etc.), thereby preventing legitimate traffic from using the resource. A DoS attack may also be distributed, to conceal the presence of the attack. For example, a distributed DoS (DDoS) attack may involve multiple attackers sending malicious requests, making it more difficult to distinguish when an attack is underway.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
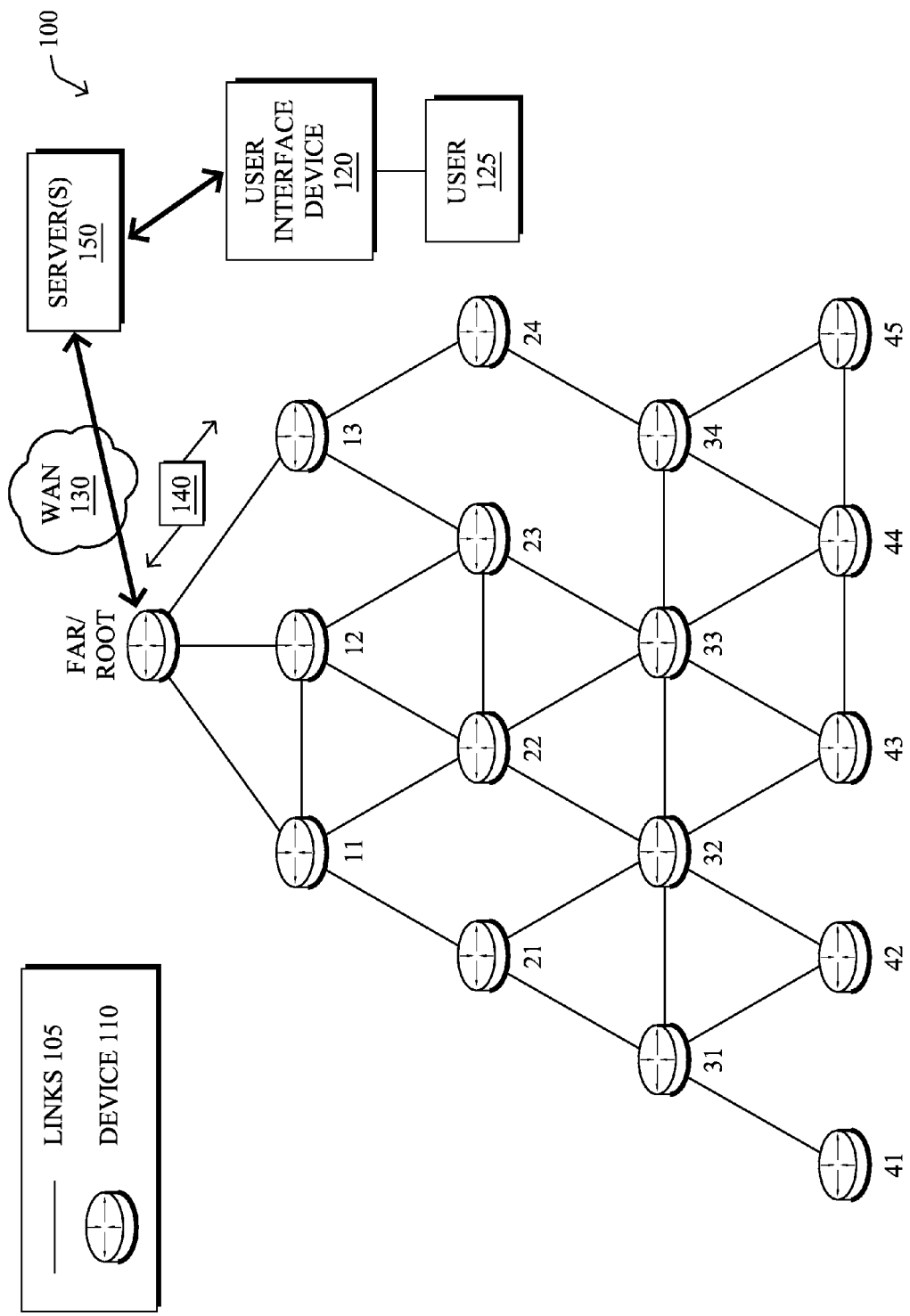
FIG. 1 illustrates an example communication network.

According to one or more embodiments of the disclosure, attack observations by a first node are provided to a user interface device regarding an attack detected by the node. Input from the user interface device is received that confirms that a particular attack observation by the first node indicates that the attack was detected correctly by the first node. Attack observations by one or more other nodes are provided to the user interface device. Input is received from the user interface device that confirms whether the attack observations by the first node and the attack observations by the one or more other nodes are both related to the attack. The one or more other nodes are identified as potential voters for the first node in a voting-based attack detection mechanism based on the attack observations from the first node and the one or more other nodes being related.

In further embodiments, a network device detects a potential network attack based on observations by the network device regarding the network. The observations are provided to a user interface device. A confirmation is received from the user interface device that confirms that the network attack was detected correctly. Data indicative of a set of one or more other network devices is received as eligible voters. The network device also optimizes a voting-based attack detection mechanism using the set of one or more eligible voters.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 110 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 110, such as, e.g., routers, sensors, computers, etc., may be in communication with other nodes 110, e.g., based on distance, signal strength, current operational status, location, etc. The illustrative root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

As shown, computer network 100 may also include a user interface device 120 that may be operated by a human user 125. In general, user interface device 120 is operable to provide sensory information to user 125 and/or to receive input data from user 125. For example, user interface device 120 may include, or may itself be, an electronic display (e.g., to provide information to user 125 visually), one or more speakers (e.g., to provide information to user 125 audibly), etc., to provide information to user 125. Conversely, user interface device 120 may include, or may itself be, a keyboard or keypad, a microphone, a touch-screen display, a pointing device (e.g., a mouse), or the like, to receive input data from the user. In various embodiments, user interface device 120 may be connected to one of servers 150 either as a peripheral device (e.g., a touch-screen display, etc.) or as a standalone computing device (e.g., a personal computer).

Figure 2:
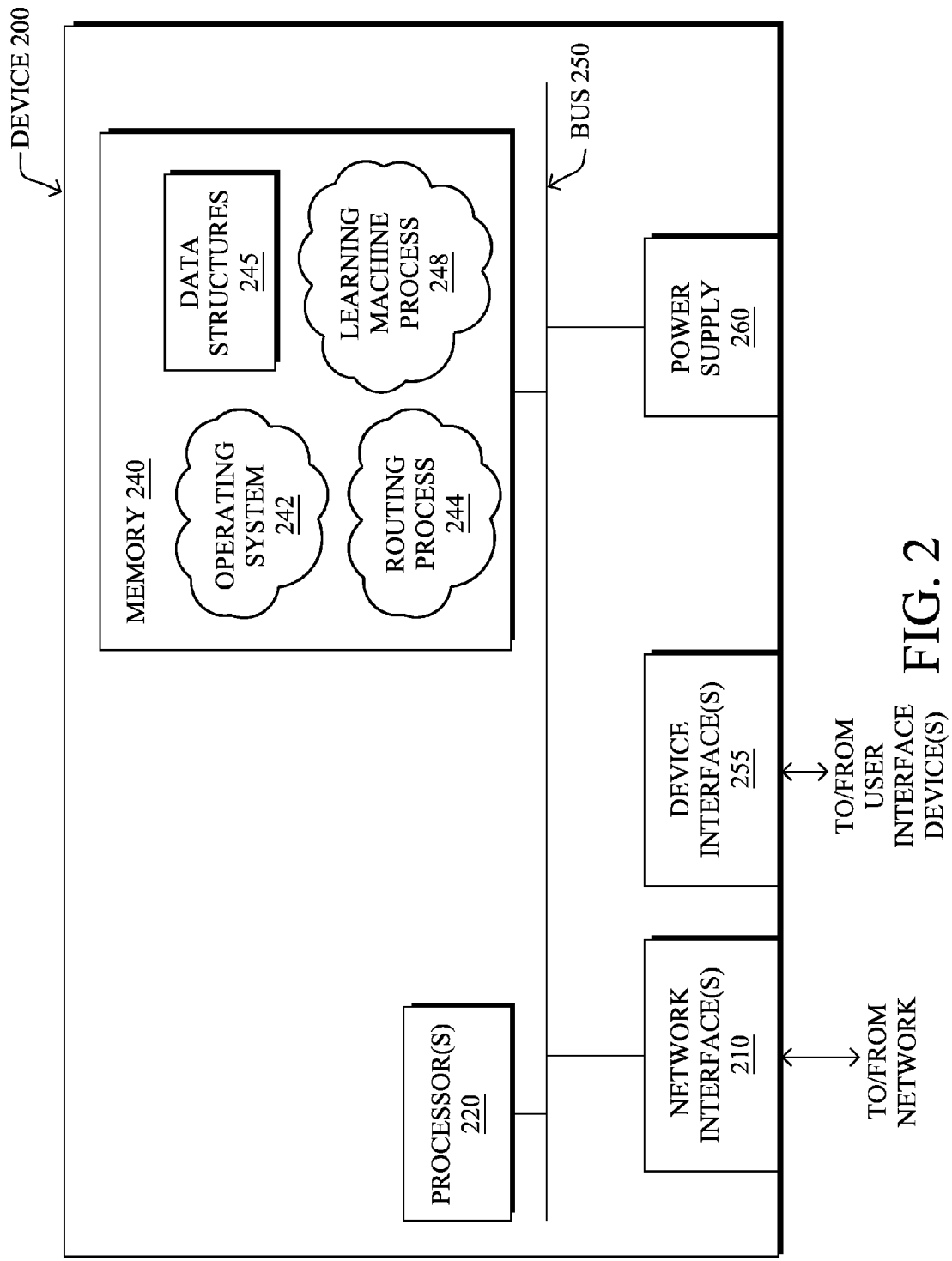
FIG. 2 illustrates an example network device/node.

FIG. 2 is a schematic block diagram of an example node/device 200 that may be used with one or more embodiments described herein, e.g., as any of the nodes or devices shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC (where the PLC signal may be coupled to the power line feeding into the power supply) the network interface 210 may communicate through the power supply 260, or may be an integral component of the power supply.

In some embodiments, device 200 may include one or more device interfaces 255 to communicate with a user interface device, such as user interface device 120. For example, device interfaces 255 may include a Universal Serial Bus (USB) interface, a wireless interface, an infrared interface, or the like. In embodiments in which user interface device 120 is itself a computing device, user interface device 120 may alternatively communicate with device 200 via network interfaces 210.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise a routing process/services 244 and an illustrative "learning machine" process 248, which may be configured depending upon the particular node/device within the network 100 with functionality ranging from intelligent learning machine processes to merely communicating with intelligent learning machines, as described herein. Note also that while the learning machine process 248 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 includes computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Learning machine process 248 includes computer executable instructions executed by the processor 220 to perform various functions, such as attack detection and reporting. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

As also noted above, learning machines (LMs) are computational entities that rely on one or more machine learning processes for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator.

Artificial Neural Networks (ANNs) are a type of machine learning technique whose underlying mathematical models that were developed inspired by the hypothesis that mental activity consists primarily of electrochemical activity between interconnected neurons. ANNs are sets of computational units (neurons) connected by directed weighted links. By combining the operations performed by neurons and the weights applied by the links, ANNs are able to perform highly non-linear operations to input data. The interesting aspect of ANNs, though, is not that they can produce highly non-linear outputs of the input, but that they can learn to reproduce a predefined behavior through a training process. Accordingly, an ANN may be trained to identify deviations in the behavior of a network that could indicate the presence of a network attack (e.g., a change in packet losses, link delays, number of requests, etc.).

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic may generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnects are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are included in paths oriented toward and terminating at one or more root nodes (e.g., "clusterheads" or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by a DAG process) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.)

Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF RFC, entitled "Routing Metrics used for Path Calculation in Low Power and Lossy Networks" <RFC 6551> by Vasseur, et al. (March 2012 version). Further, an example OF (e.g., a default OF) may be found in an IETF RFC, entitled "RPL Objective Function 0" <RFC 6552> by Thubert (March 2012 version) and "The Minimum Rank Objective Function with Hysteresis" <RFC 6719> by O. Gnawali et al. (September 2012 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
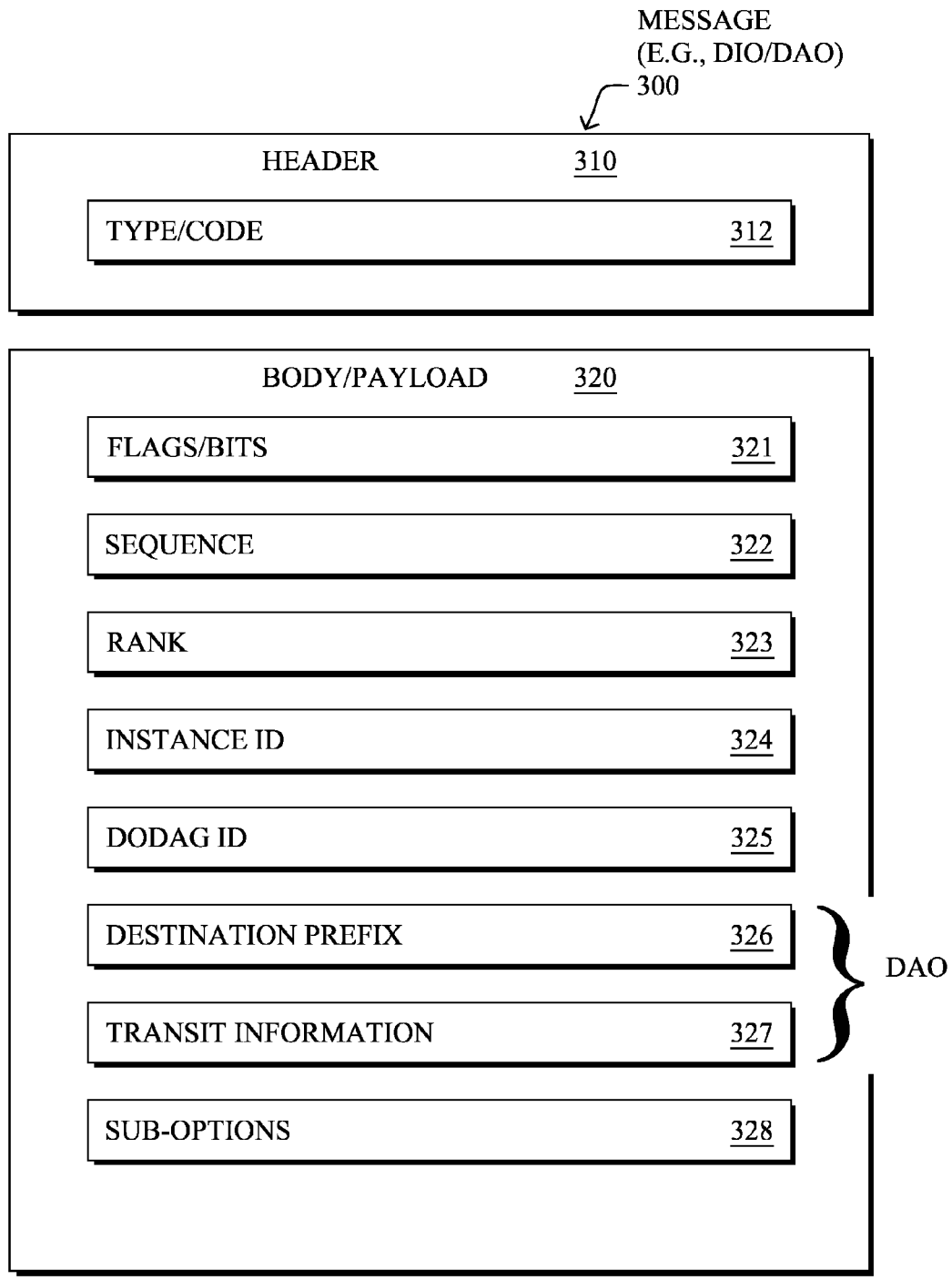
FIG. 3 illustrates an example message.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
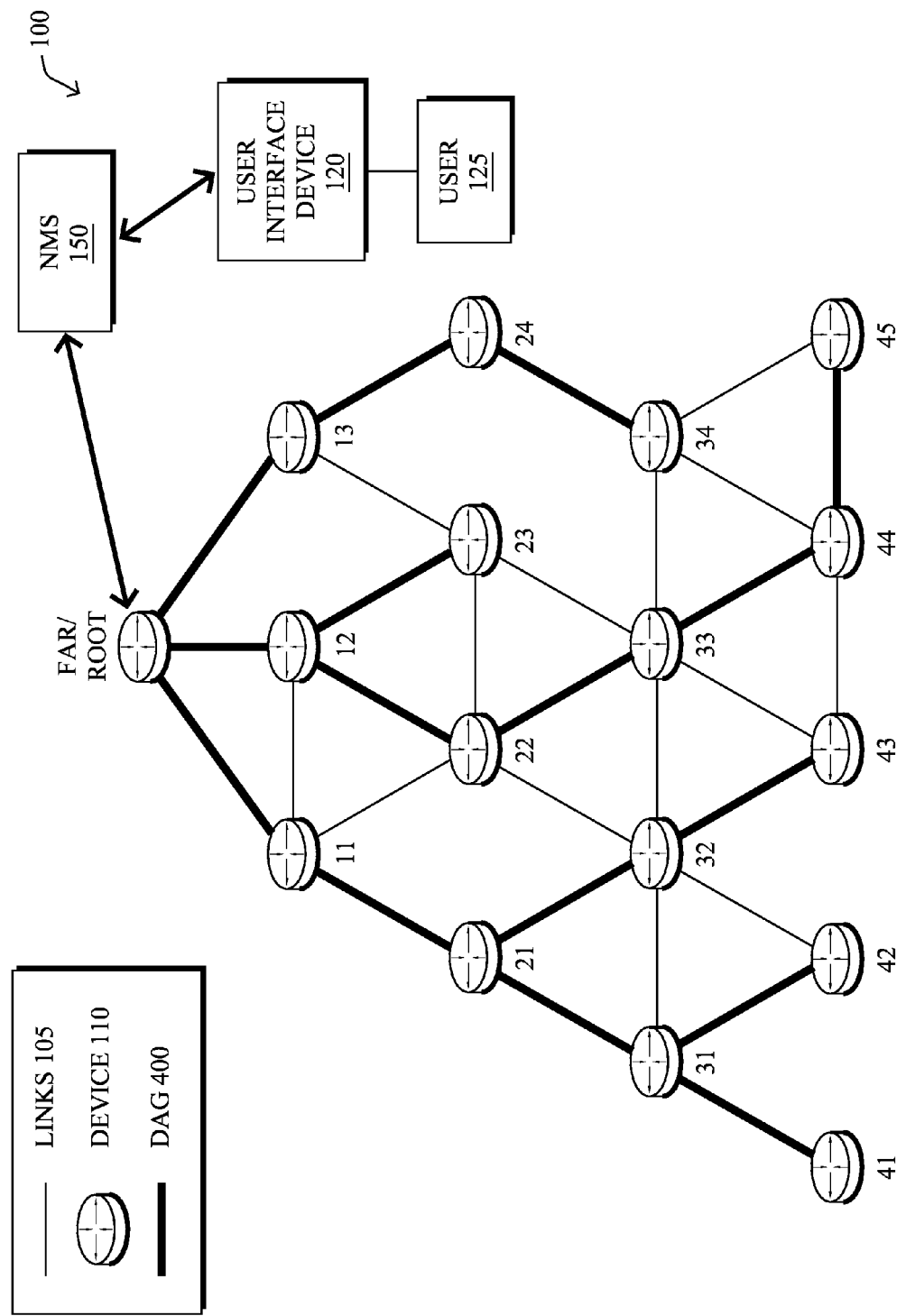
FIG. 4 illustrates an example directed acyclic graph (DAG) in the communication network of FIG. 1.

FIG. 4 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein.

As noted above, LLNs are typically limited in terms of available resources and tend to be more dynamic than other forms of networks, leading to a number of challenges when attempting to detect DoS and other forms of network attacks. In particular, the limited computing resources available to a given network node may prevent the node from hosting a full-fledged learning machine process. In some cases, the node may simply export observation data to a learning machine hosted by a device with greater resources (e.g., a FAR). However, doing so also increases traffic overhead in the network, which may impact performance in an LLN.

According to various embodiments, lightweight learning machine classifiers may be distributed to network nodes for purposes of attack detection. In general, a classifier refers to a machine learning process that is operable to associate a label from among a set of labels to an input set of data. For example, a classifier may apply a label (e.g., "Attack" or "No Attack") to a given set of network metrics (e.g., traffic rate, etc.). The distributed classifiers may be considered "lightweight" in that they may have lower computational requirements than a full-fledged classifier, at the tradeoff of lower performance. To improve attack detection, a central computing device (e.g., a FAR, NMS, etc.) that has greater resources may execute a more computationally intensive classifier in comparison to the distributed lightweight classifier. In cases in which a distributed classifier detects an attack, it may provide data to the central device to validate the results and/or to initiate countermeasures. However, since the performance of a distributed classifier may be relatively low, this also means that there may be a greater amount of false positives reported to the central classifier.

Figure 5A:
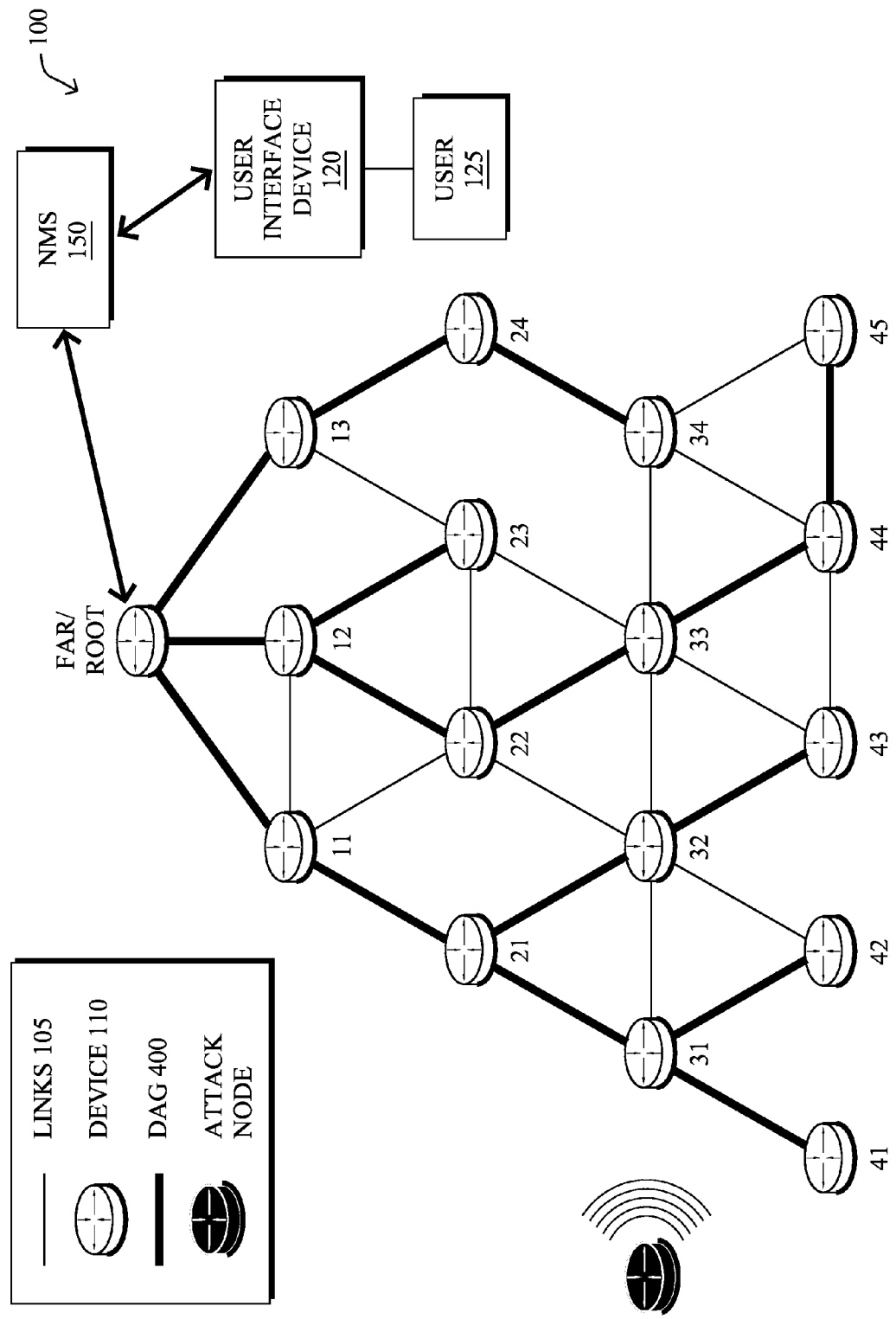
FIGS. 5A-5B illustrate an example of the detection and reporting of a potential network attack.
Figure 5B:
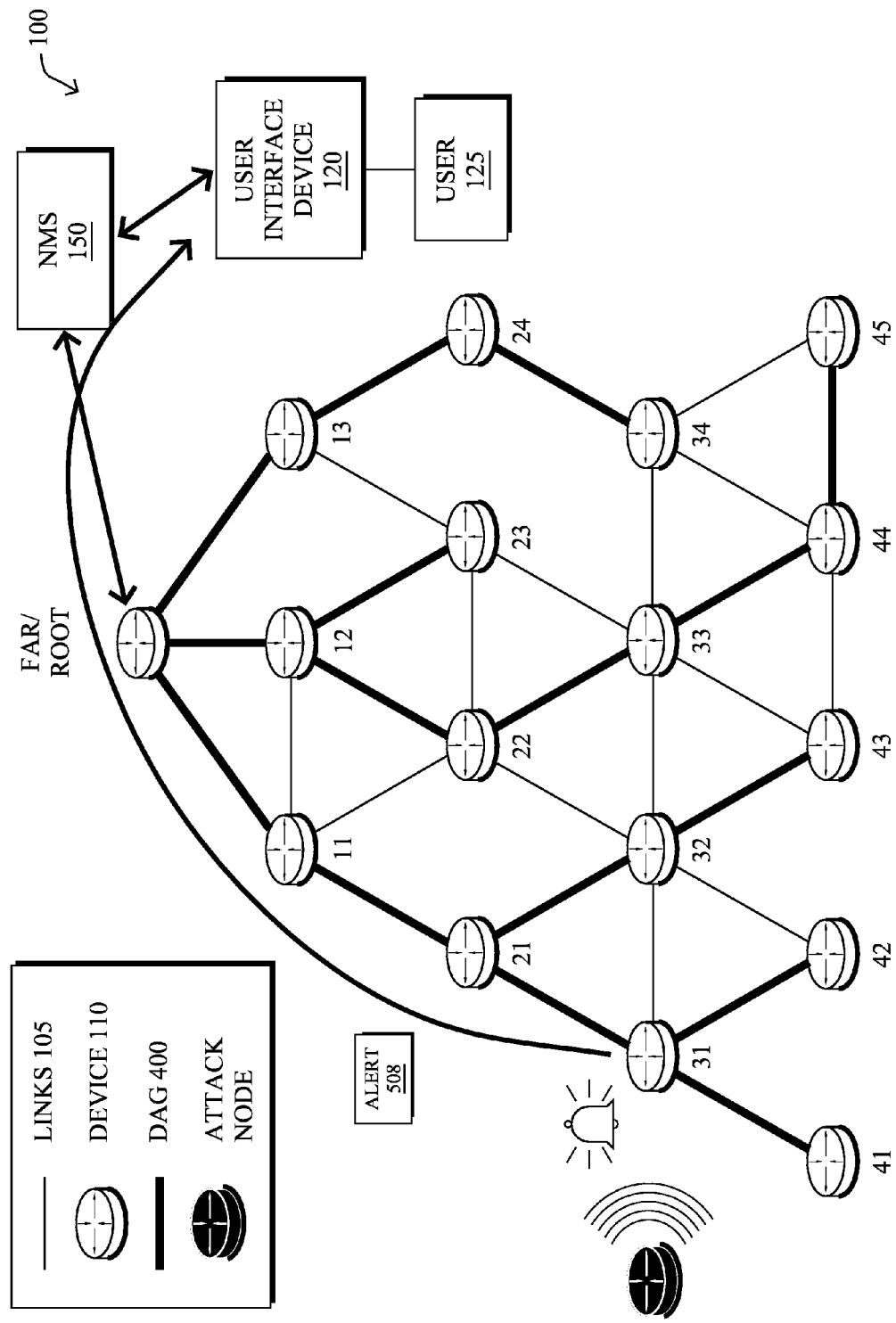

Referring now to FIGS. 5A-5B, an example is illustrated of a network attack being detected and reported within network 100. Assume for illustrative purposes that light- weight classifiers are distributed to the various nodes in network 100 and that a more power classifier is executed by the FAR. As shown in FIG. 5A, an attack node/device may launch an attack targeted at node 31. As a result of the attack, a lightweight classifier on node 31 may detect the attack based on an observed feature set of information (e.g., transmission success rates, reception success rates, etc.), as shown in FIG. 5B. In response, node 31 may generate and send an alert 508 to a supervisory device (e.g., the FAR) to verify the attack using a more powerful classifier and/or to take corrective measures. Alternatively, or in addition to alerting the FAR, node 31 may broadcast alerts to the other nodes in network 100, to initiate corrective measures. In cases in which alert 508 is a false positive, however, this means unnecessary traffic within network 100, which may already have limited bandwidth available.

Figure 6A:
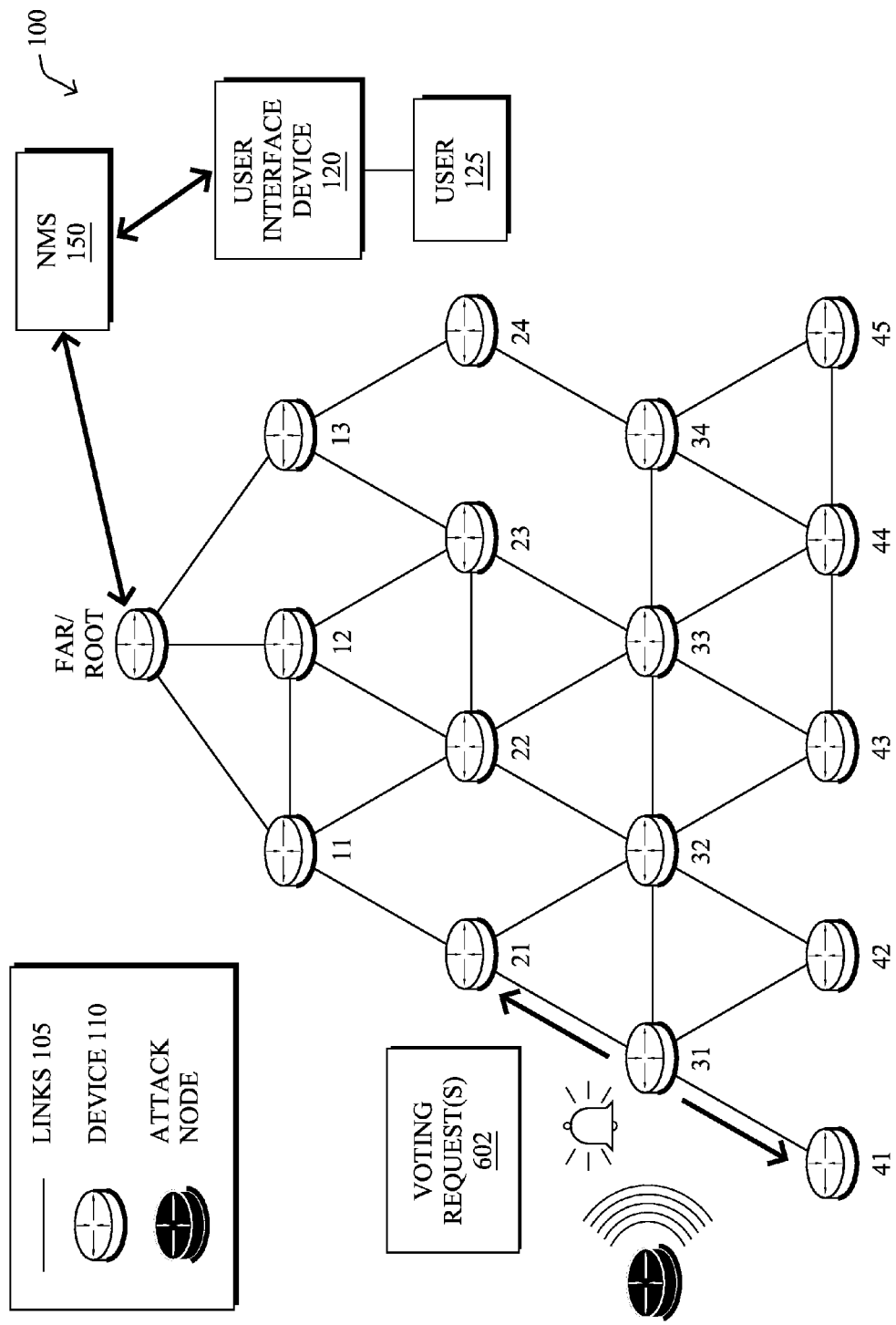
FIGS. 6A-6D illustrate an example of a voting-based attack detection mechanism.
Figure 6B:
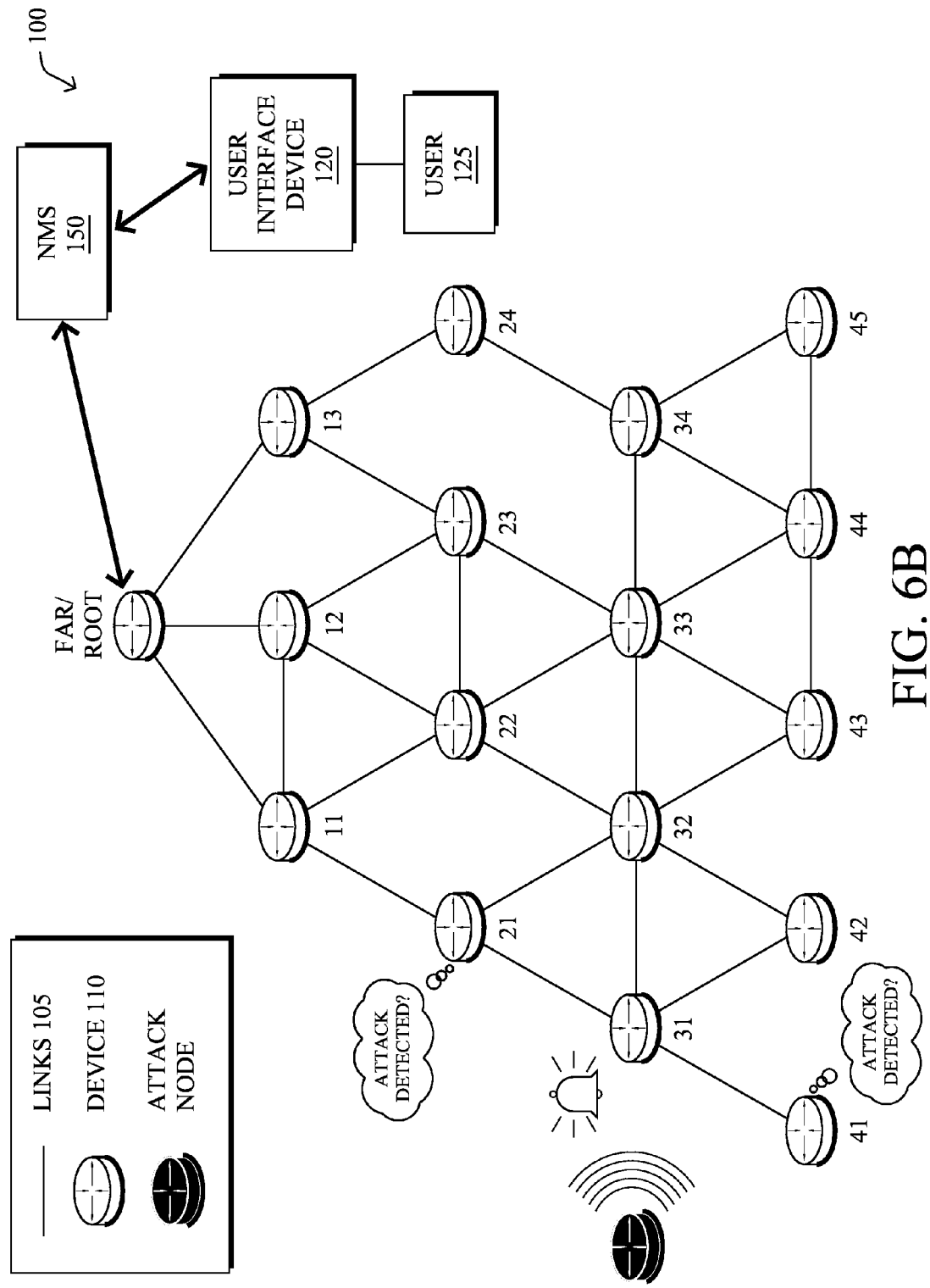
Figure 6C:
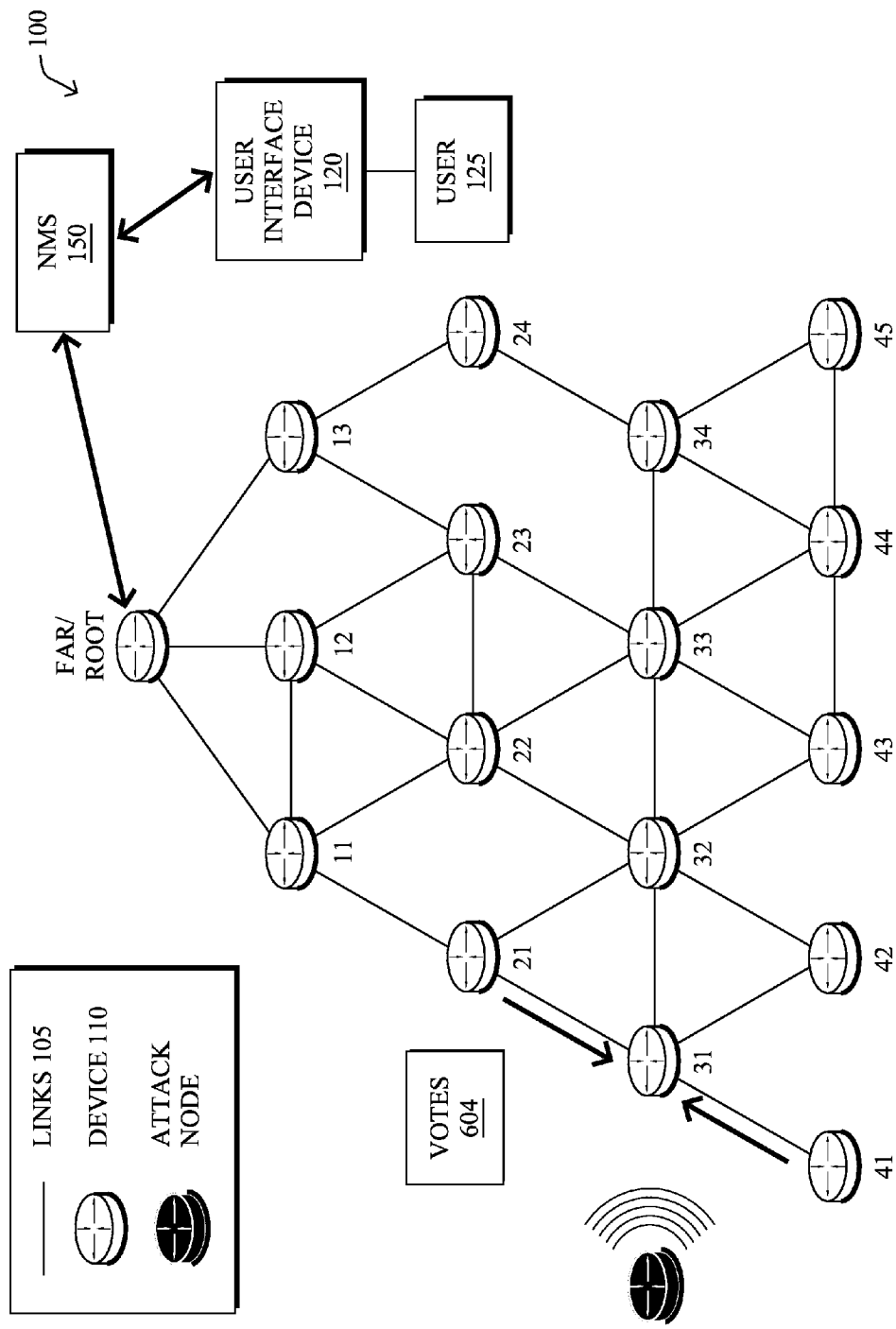
Figure 6D:
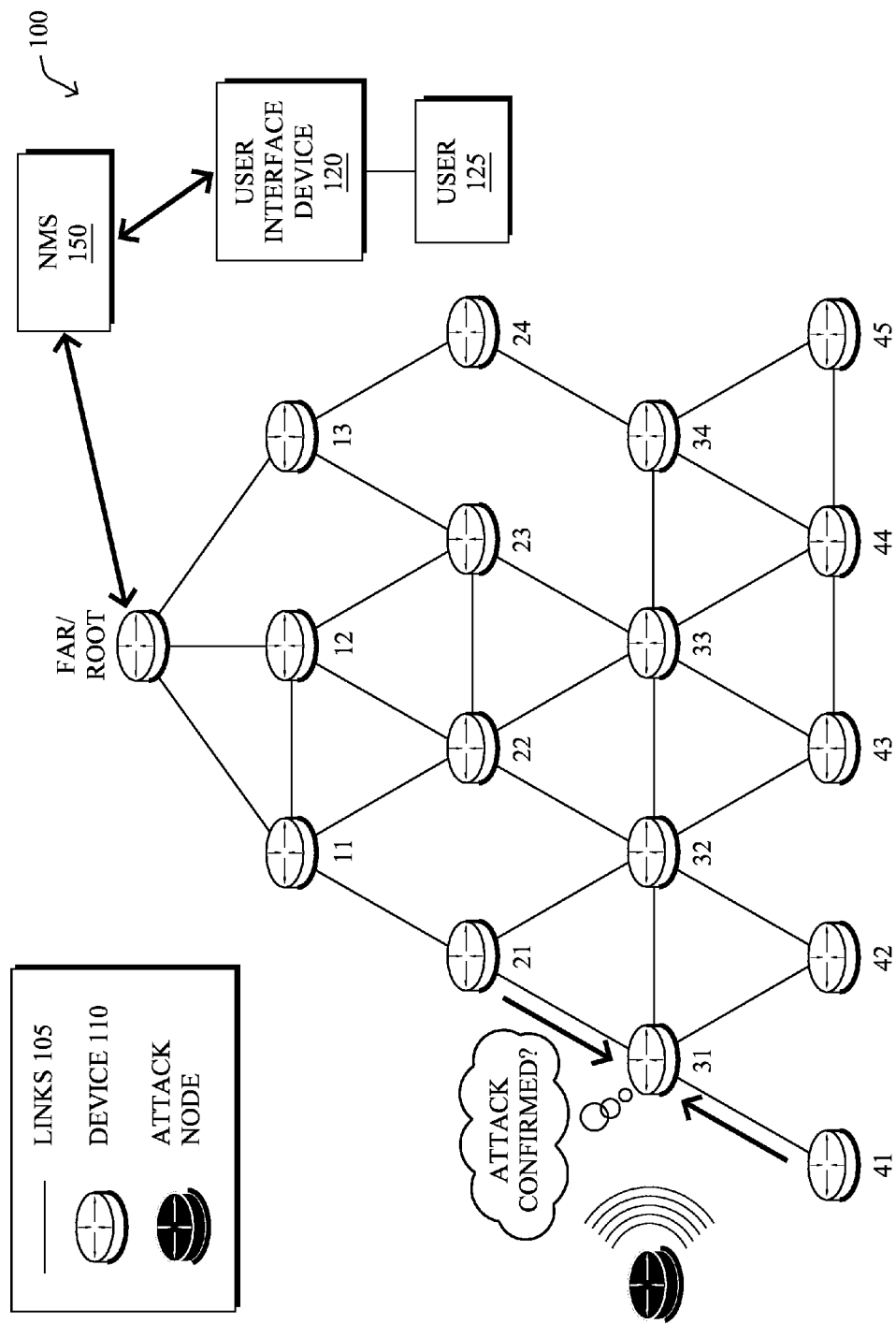

To reduce the number of false positives, a voting mechanism may be implemented within network 100 to validate a detected attack before the supervisory device is notified. For example, as shown in FIGS. 6A-6D, a voting-based attack detection mechanism is shown in which a particular node initiates a voting process to confirm an attack before taking further measures (e.g., sending an alert to the FAR, alerting other nodes, etc.). In various embodiments, the nodes that participate in the voting process may be located anywhere in the network (e.g., voters may be neighboring nodes, non-neighboring nodes, or even nodes that are connected to a different FAR/root). After detection of an attack, node 31 may send voting requests 602 to a set of authorized voters, as shown in FIG. 6A. In response, the voters may use their own local classifiers to determine whether an attack is present, as depicted in FIG. 6B. Such a vote may be based on observations by the voters themselves or observation data from node 31 that is included in voting requests 602. As shown in FIG. 6C, the voters may then respond to node 31 with votes 604. Alternatively, in some embodiments, node 31 may locally execute copies of the classifiers of the voters, to locally generate votes 604. Node 31 then uses votes 604 to determine whether the detected attack is verified, as shown in FIG. 6D. If so, node 31 may then send an alert to the FAR or take other measures. According to various embodiments, such a voting mechanism may also be optimized to determine which voters should participate in a vote, potentially reducing network overhead caused by a vote and improving the overall detection results.

Optimizing a pool of voting classifiers and/or how the voters reach a consensus is not without challenges. In particular, the suitability of a potential voter, as well as the credence that should be given to the vote submitted by the potential voter, is heavily dependent on the current configuration of the classifier, the types of information that are observable by the voter (e.g., to make an independent judgment regarding a potential attack), the physical or logical location of the voter in the network, and other such factors. In some cases, suitability of a potential voter may be assessed by evaluating how the classifier performs in view of a ground truth. As used herein, "ground truth" generally refers to a set of input data for which the corresponding label is objectively known. For example, assume that it is objectively known that a particular node is under attack when a set of performance metrics regarding the node have a certain set of values. Accordingly, such values may be used to train a classifier and/or to evaluate how well an existing classifier is able to correctly classify the data.

One potential way to establish a set of ground truths is to simulate network attacks. Since the time and place of the attacks are known, the resulting metrics that are generated during the attacks may be treated as ground truths for purposes of training classifiers and/or optimizing a voting process. However, such an approach typically requires additional infrastructure (e.g., devices to initiate the controlled attacks) and may not be feasible in certain types of networks.

Ground Truth Evaluation for Voting Optimization

The techniques herein provide for the optimization of a voting mechanism among a set of machine learning classifiers to select the optimal set of voters that a network device may ask to participate in a vote when the network device detects an attack. In various aspects, the voting optimization may be coordinated by a network controller which may, by asking the advice of an external expert (e.g., a human user or another system), establish a ground truth for attack detection. Such a ground truth may be used to assess the capability/suitability of other network devices to contribute votes regarding a potential attack detected by the network device.

Specifically, according to one or more embodiments of the disclosure as described in detail below, attack observations by a first node are provided to a user interface device regarding an attack detected by the node. Input from the user interface device is received that confirms that a particular attack observation by the first node indicates that the attack was detected correctly by the first node. Attack observations by one or more other nodes are provided to the user interface device. Input is received from the user interface device that confirms whether the attack observations by the first node and the attack observations by the one or more other nodes are both related to the attack. The one or more other nodes are identified as potential voters for the first node in a voting-based attack detection mechanism based on the attack observations from the first node and the one or more other nodes being related.

Illustratively, the techniques described herein may be performed by hardware, software, and/or firmware, such as in accordance with the learning machine process 248, which may include computer executable instructions executed by the processor 220 (or independent processor of interfaces 210) to perform functions relating to the techniques described herein, e.g., in conjunction with routing process 244. For example, the techniques herein may be treated as extensions to conventional protocols, such as the various PLC protocols or wireless communication protocols, and as such, may be processed by similar components understood in the art that execute those protocols, accordingly.

Operationally, any number of network devices may host a learning machine (e.g., learning machine process 248) configured to classify network data by applying a label to the network data. For example, such a classifier may label metrics regarding a device's performance (e.g., processor usage, queue lengths, etc.), traffic metrics (e.g., traffic volume, bandwidth consumed, number of requests, etc.) and/or link metrics (e.g., dropped packets, jitter, etc.), as either "normal" or "attack." Also, a classifier can take as input a vector combining a set of the afore-mentioned metrics. To confirm a conclusion reached by such a classifier on a first device, voting may be performed by tallying votes from any number of other devices that also host learning machine classifiers. In some embodiments, a central controller may coordinate the voting. Notably, such a deployment scenario may be likely in large-scale IoT deployments and other forms of networks.

As used herein the following terminology is introduced:

Triggering node—A triggering node may be any node that hosts a learning machine process that initiates a vote among a set of other classifiers in response to reaching a specific conclusion (e.g., by applying a specific label to a set of input features) or, if a set of voters is not available, initiates voter selection. For example, a triggering node may initiate a vote among a set of peer classifiers, in response to detecting an attack. If the set of peer classifiers is unknown to the node, detection of the attack may trigger a process whereby voters are selected. Also, the triggering node may initiate the voting procedure by contacting a central entity, which will rely a voting request to a suitable set of peers.

$C(R_i)$—The voting constituency for the triggering node $R_i$, (e.g., a router). In other words, $C(R_i)$ may include the set of N-number of peer devices that host classifiers that are compatible with that of $R_i$ and are selected as voters for $R_i$. In various embodiments, N may be a variable parameter for which an upper bound may be configured (e.g., too many voters may result in performance degradation). Note also that a potential voting classifier may have to be compatible with that of $R_i$, to be eligible for inclusion in $C(R_i)$. For example, the set of labels that may be applied by a potential voter may be required to match, or be a subset of, the labels used by $R_i$. In other words, a classifier that uses the labels {Congestion Present, Congestion Not Present} may not be compatible with a classifier that uses the labels {Attack Present, Attack Not Present}.

K—A voting threshold used to either confirm or reject a conclusion reached by the triggering node (e.g., that an attack is detected). For example, a conclusion reached by the triggering node $R_i$ may be confirmed by the N-number of voters in $C(R_i)$ if K or more voters in $C(R_i)$ reach the same conclusion. For example, three out of five peer routers may be required during a vote to confirm that the triggering router detected an actual attack.

$w_j$—A weight that may optionally be applied to the vote cast by a given classifier participating in the voting process. For example, a given vote may be based on metrics regarding the classifier's recall and/or precision. In cases in which a vote weight is not specified, it may be assumed that each vote has a weight of one for every peer classifier casting a vote.

According to various embodiments, voting optimization may be treated by a device as a discrete optimization problem that seeks to maximize or minimize an objective function subject to one or several constraints, and where all the variables involved take only natural values. In one embodiment, the objective function may quantify the number of times that a set S of voters having a voting threshold K was able to correctly classify a set of input features. For example, assume that a set of input features is known to indicate the presence of an attack (e.g., is a ground truth). Assume also that a set of five voters is being evaluated with a voting threshold of K=3. If three or more of the voters correctly classified the set of input features as an attack, then the total number of correct classifications associated with the set and voting threshold may be incremented. The optimization process may then operate to find the maximal number of correct classifications by a set/voting threshold pair, while also seeking to reduce the size of the set of potential voters. Accordingly, any or all network devices that host learning machine classifiers may be configured with an optimized voting constituency (e.g., for each possible attack type that can be detected by its classifier) and/or optimized voting threshold.

Figure 7:
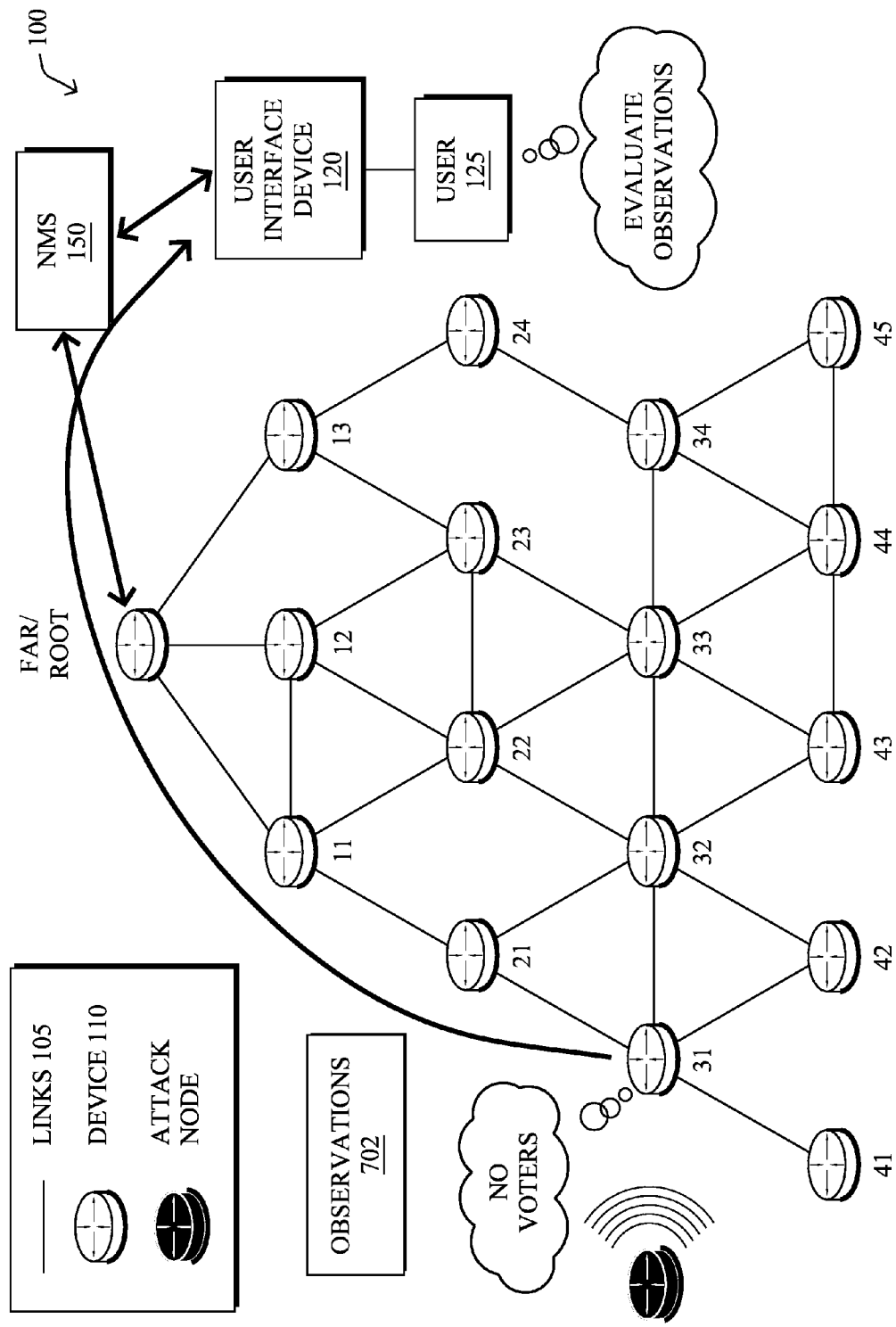
FIG. 7 illustrates an example of attack observations being provided to a user interface device.

Referring now to FIG. 7, assume that node 31 hosts a learning machine classifier to detect attacks, but has not been configured with a voting constituency to verify a detected attack. In response to detecting a potential attack, node 31 may send observations 702 regarding the attack to a supervisory device, such as the FAR/Root, an NMS 150, or the like. Note also that a receiving device may forward observations 702 to another device (e.g., the FAR/Root may independently forward observations 702 to NMS 150), depending on the configuration of the network. In various embodiments, observations 702 may function as a constituency request message and may include any or all of the following information:

An attack identifier—Observations 702 may include an identifier for the type of attack detected by the node. Such an identifier may alternatively be known as an attack signature.

Classifier Inputs and Outputs—Observations 702 may include the set of feature vectors (e.g., performance metrics, measurements, etc.) that were collected during the alleged attack and used as classifier inputs to detect the attack. Associated with the feature vectors may also be the output labels assigned by the classifier to each sample. In one embodiment, if the number of vectors exceeds a threshold amount, the triggering node may utilize sampling to select a subset of samples to send.

Sampling Information—If sampling is used to reduce the set of classifier inputs and outputs included in observations 702, information may also be included in observations 702 to indicate the total number of feature vectors that were observed during the alleged attack.

In response to receiving observations 702 as part of a request for a voting constituency, NMS 150, the FAR/Root, or other supervisory device may initiate the establishment of a ground truth for the detected attack. In some embodiments, the receiving device may identify one or more "expert" devices that host machine learning classifiers. For example, the receiving device may send a multicast message to the distributed classifiers in the network, to request information regarding the performance characteristics (e.g., precision, recall, etc.) of the classifiers and their areas of expertise (e.g., a particular classifier may be better able to detect an attack at one location in the network than another location). Observations 702 may then be provided to any identified experts, to establish a ground truth by flagging the pairs of labels and input samples from the originating classifier as either correct or incorrect.

In some embodiments, one or more human experts may be asked to establish a ground truth with respect to observations 702. For example, as shown in FIG. 7, observations 702 may be provided to user interface device 120 for analysis by user 125. User 125 may then manually label the set of feature vectors included in observations 702 and/or confirm whether the labels generated by the classifier on node 31 were correct.

In cases in which node 31 employed sampling to reduce the size of observations 702 by limiting the set of feature vectors, a dataset request message may be sent by user interface device 120, to retrieve the full set of observations regarding the attack detected by node 31. Such a request may also indicate a time period for the requested observation data (e.g., how far back node 31 should retrieve the data of interest).

Figure 8:
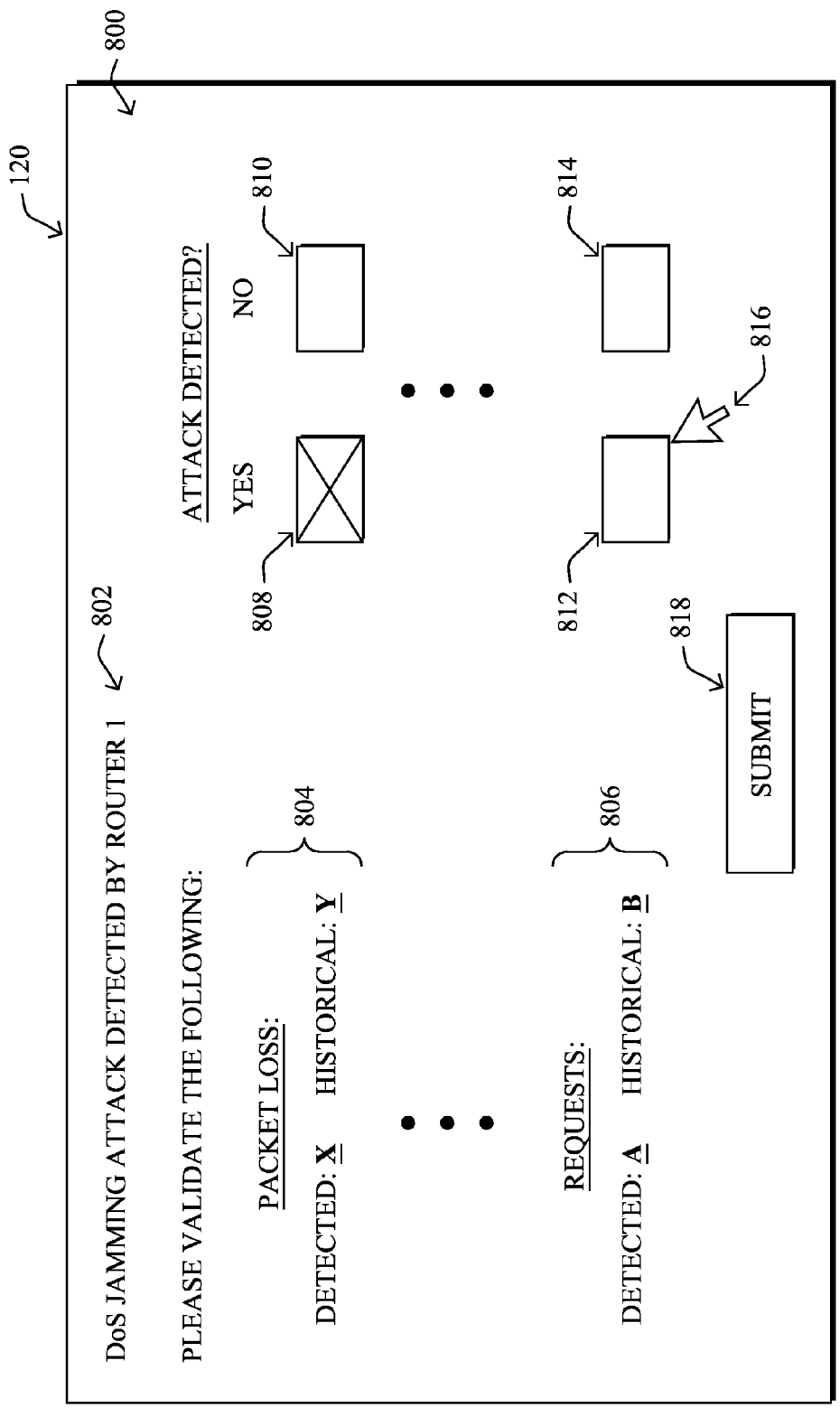
FIG. 8 illustrates an example graphical user interface (GUI)

Referring now to FIG. 8, an example graphical user interface (GUI) 800 is shown, according to various embodiments. GUI 800 may be provided to an electronic display, such as that of user interface device 120, by a processing circuit. Such a processing circuit may be integrated directly into user interface device 120 (e.g., user interface device 120 may be a computing device that is networked with NMS 150 or another supervisory device) or may be external to user interface device 120 (e.g., user interface device 120 may be a peripheral display connected to NMS 150 or another supervisory device). A user (e.g., user 125) may interact with GUI 800 either directly (e.g., in the case of a touch screen display) or via one or more associated peripheral devices (e.g., a keyboard, a mouse, etc.).

In general, GUI 800 may be operable to request that one or more human users (e.g., user 125) establish a ground truth by evaluating the data included in observations 702. Accordingly, GUI 800 may include an indication 802 that identifies the type of attack (e.g., a DoS Jamming Attack), the physical or logical location of the attack (e.g., under the area covered by router 1, by node 31, etc.), or any other information that may be used by the reviewing user.

In some embodiments, GUI 800 may ask user 125 to apply a binary label to each of the observations associated with a potential attack that was detected. For example, as shown, any number of observations 804-806 (e.g., a set of first through nth number of features used by the classifier to detect the attack) may be presented as part of GUI 800. GUI 800 may also include any number of input fields 808-814 associated with the observations 804-806 and are configured to receive input from user interface device 120 (or an associated peripheral interface device) that either confirms or refutes that a particular observation indicates the presence of an actual attack. For example, user 125 may manipulate interface device 120 to position cursor 816 over input field 812 and "click" field 812, to signify that observations 806 indeed indicate the presence of an attack. Once complete, the user may select input button 818, to submit the ground truth information entered into input fields 808-814 for further processing. As will be appreciated the specific text and input fields shown in GUI 800 are illustrative only and that any number of other fields, text, images, screens, windows, etc., may be included in other GUIs configured to receive ground truth information from a human user.

If the result of the ground truth evaluation by one or more experts indicates that the detected attack is a false positive, the supervisory device may take any number of actions either automatically or in response to a request from the user. In some cases, the supervisory device may initiate a recomputation of the alerting node's classifier (e.g., to avoid future false positives) using a training set that includes the ground truth data from the expert. For example, the supervisory device may use the ground truth data to train a new classifier and provide the new classifier to the node. Alternatively, the supervisory device may provide the ground truth data as part of a training set to the node, thereby allowing the node to compute a new classifier.

Further actions regarding a false positive may also be delayed until a future point in time, such as when another false positive is detected. For example, an expert may be able to specify that the collected observation data is not sufficient to make a final decision regarding the ground truth (e.g., via a GUI presented to a user interface device or via an expert classifier). In such a case, the supervisory device may respond with a voting abort request to the node hosting the classifier (e.g., node 31). In response, the node may then trigger again the same procedure, the next time the local classifier of the node detects an attack (e.g., since the node has not yet been configured for voting), thus providing more data for the expert to analyze. Optionally, if additional data is available, this information may also be included in the new observations sent to the supervisory device.

In cases in which the expert determines that an actual attack has been detected, the supervisory device may select a set of candidate peers (e.g., potential voters) that are eligible to become part of the triggering node's constituency. In one embodiment, a network policy engine may be leveraged to select the candidate peers that satisfy a set of eligibility requirements to participate in the vote. Such eligibility requirements may include, for example, compatibility requirements for the triggering node's classifier (e.g., input features, labels, etc. of the classifier), resource requirements (e.g., available bandwidth, processing power, memory, etc.), proximity to the triggering node, and any other such factor.

In cases in which one or more experts confirm an attack detected by a node, various actions may be taken to determine an optimal constituency for the node, depending on the underlying voting strategy. As noted previously with reference to the example of FIGS. 6A-6D, voting may be carried out by having the triggering node export the feature vectors (e.g., observations) used to detect the attack to the node's voting constituency. In other words, the voting strategy may entail asking the voters to evaluate the observations of the triggering node, to confirm or deny the attack detected by the triggering node. For example, as shown in FIG. 6A, voting requests 602 may include the feature vectors used by node 31 to detect a potential attack. In response, the voting nodes then return votes 604 by applying their own classifiers to the feature vectors from node 31. Such a voting strategy is referred to herein as a "single dataset approach," since different classifiers are applied to the same dataset during voting.

Another voting strategy may entail a voter using its own set of observations to independently confirm or deny an attack detected by the triggering node, also as noted previously. For example, voting request 602 may alternatively include an indication of the detected attack (e.g., attack type, time of attack, etc.). In response, the voters may confirm or deny the presence of the attack based on their own feature vectors, as opposed to those generated by the triggering node. Such a voting strategy is referred to herein as an "independent assessment approach," since the voters apply their own independently-generated feature data to their respective classifiers during a vote. Notably, an independent assessment approach may also encompass hybrid approaches in which a node may be asked to use its own observations and, if not, instead classify the set of feature vectors from the triggering node.

In the case in which a single data set approach is used as the voting strategy, voting optimization may be performed by conducting a vote among the eligible voters using the ground truth data confirmed by the one or more experts. Since the observations in the feature set have been verified by the one or more experts, the votes regarding the feature set may be analyzed by the triggering node (or another device), to select an optimal constituency of voters. For example, assume that a human expert has indicated via GUI 800 that node 31 has correctly detected an attack based on observations 702, as generally shown in FIGS. 7-8. In such a case, node 31 may ask a set of eligible voters to also classify observations 702 as part of a voting request (e.g., voting request 602). The returned votes may then be used as part of an objective function to identify an optimal set of voters (e.g., a set of voters that also correctly identified the attack based on observations 702).

Figure 9A:
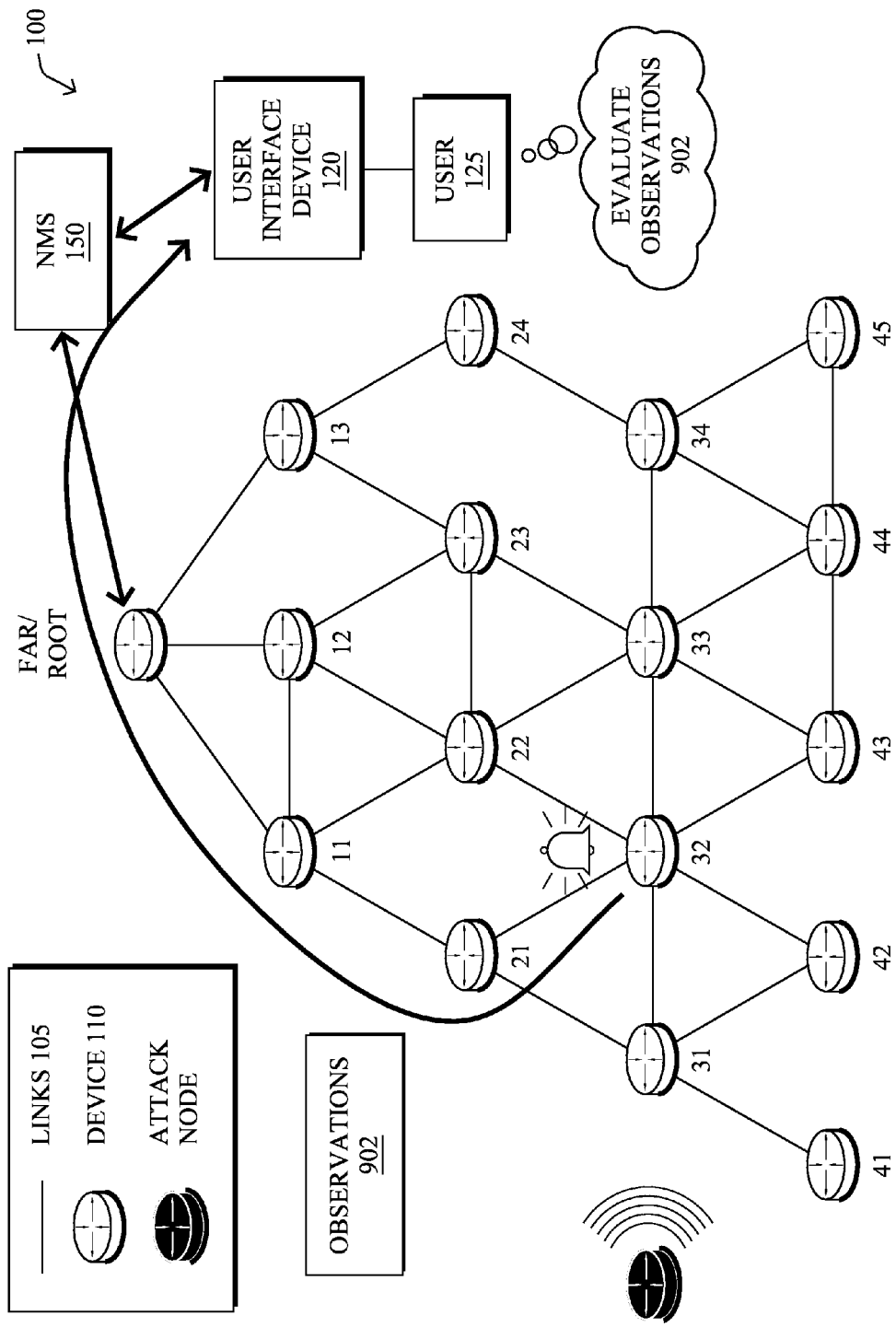
FIGS. 9A-9C illustrate an example of a voting process being optimized.
Figure 9B:
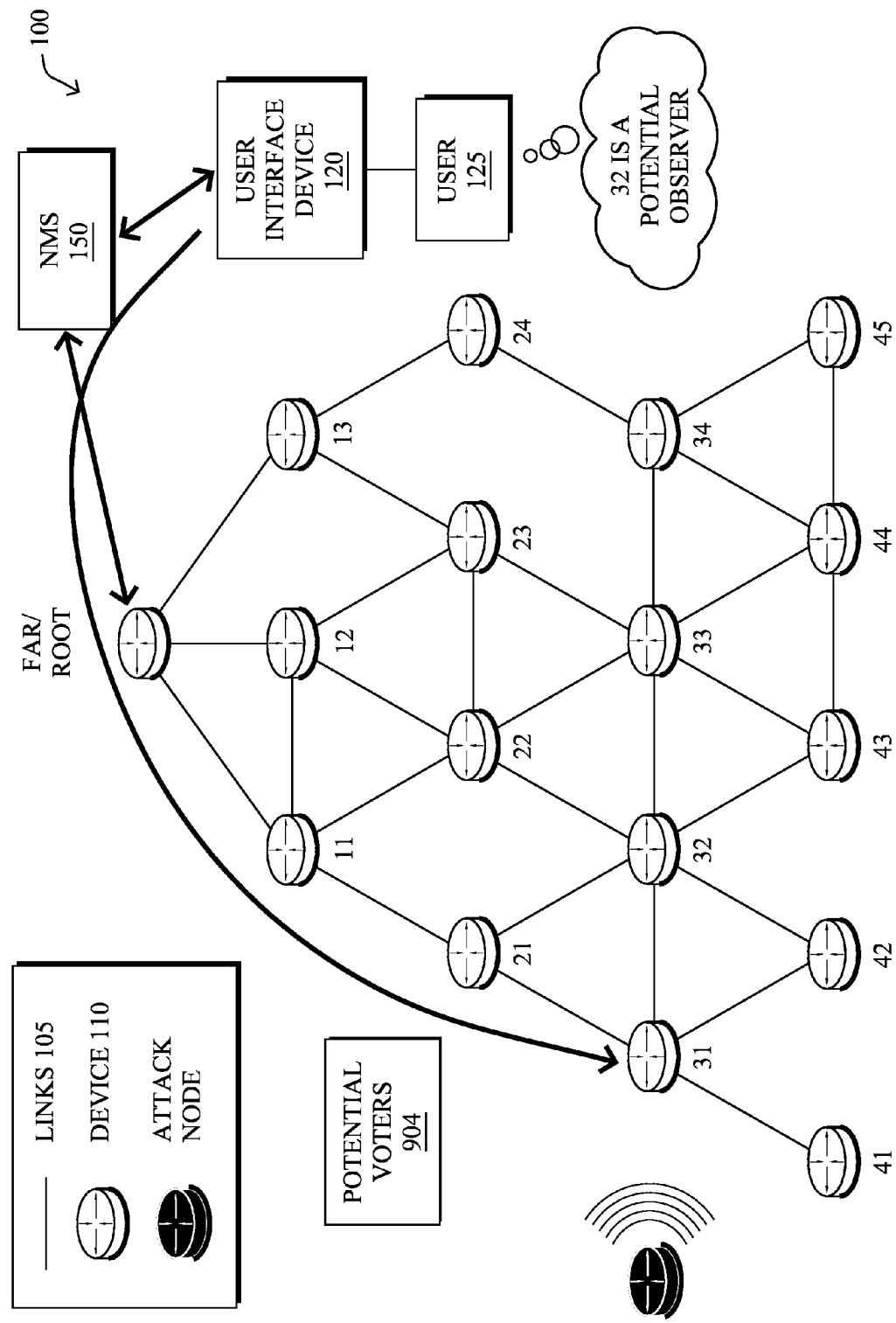
Figure 9C:
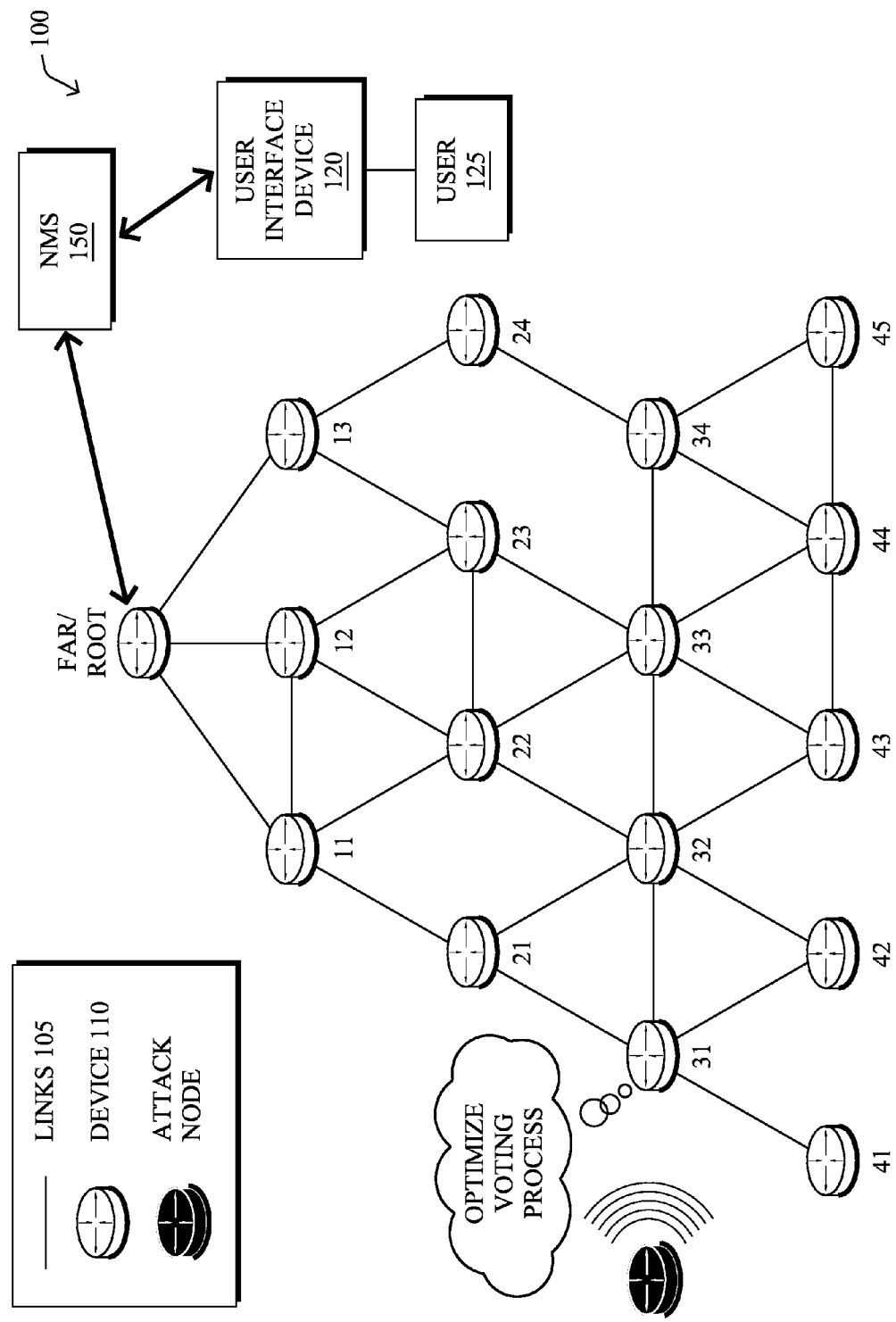

In the case in which an independent assessment approach is used as the voting strategy, the validity of the individual feature sets used by the voters may not be known. According to various embodiments, the one or more experts that verified the observations of the triggering node may also verify the observations of any potential voters in a similar manner. For example, as shown in FIGS. 9A-9C, a supervisory device (e.g., NMS 150, the FAR/Root, etc.) may send a voting sample request to a candidate node, to request the local observations of the node that relate to the detected attack. Such a request may specify a time interval for the requested data (e.g., a time during which the detected attack occurred), a target number of samples to be collected, and/or a filter for selecting interesting traffic features (e.g. the requesting device may specify a network prefix identifying the samples of interest).

As shown in FIG. 9A, assume that node 32 has been identified as an eligible voter for node 31. In such a case, NMS 150 may request observations 902 from node 32, either automatically or in response to receiving a request from user 125 via user interface device 120. Observations 902 may generally be a voting samples response message that may, in some cases, be in a similar format as that of observations 702. Additionally, like observations 702, sampling may be used by node 32 to reduce the size of observations 902. On reception of observations 902, the external expert may again be called to provide the ground truth. For example, observations 902 may be provided to GUI 800 or a similar GUI on user interface device 120, to allow user 125 to determine whether candidate node 32 was able to observe the same attack that was detected by node 31. Notably, even if node 32 independently detected an attack concurrently with node 31 detecting an attack, the attack detected by node 32 may be a false positive or may be unrelated to the attack detected by node 31. Thus, an expert may still be asked to evaluate observations 902 to verify whether an attack detected by node 32 is related to the attack detected by node 31.

If the expert (e.g., user 125) determines that the attack detected by node 31 was not observed by a candidate voter (e.g., node 32), the candidate voter may be removed from the finalized set of eligible voters for node 31. However, if the expert affirms that node 32 was able to observe the attack on node 31, node 32 may be included in the set of potential voters 904 returned to node 31, as shown in FIG. 9B. As shown in FIG. 9C, node 31 may then optimize the voting process by selecting an optimal set of voters from among potential voters 904. In some embodiments, the background truth specified by the expert regarding the observations may be used as part of the voting optimization by allowing the performance of each voter in potential voters 904 to be evaluated. For example, the labels assigned by user 125 to observations 902 may be compared to the labels applied by the classifier on node 32, to evaluate the performance of node 32 as a potential voter. An optimal set of voters may then be selected such that the subset of potential voters 904 that were best able to detect the attack on node 31 are selected as the voting constituency for node 31. Alternatively, optimization of the voting strategy of node 31 may be determined by a supervisory node (e.g., the FAR/Root, NMS 150, etc.) and provided to node 31.

Regardless of the approach taken to evaluate the ground truths for potential voters, after information has been exchanged with the nodes in the candidates set, the triggering node (or supervisory device) is able to assign to each candidate a performance score (e.g. in terms of recall and precision). Nodes whose performance indices fall below a certain threshold can be discarded from the candidates set, in one embodiment. Optionally, if the performance index of an evaluated node is too low, a recomputation of the local classifier of the evaluated node may be performed using the observations that were labeled by the expert.

Particularly in the case where an independent assessment approach is taken to perform voting, a change in the state of the network may disrupt the ability of the constituency to accurately vote on the detection of an attack. For example, a change in routing can prevent two different routers from observing the same traffic flow. When such network changes occur, a triggering node may discard its voting constituency information and request that a new voting constituency be determined from a supervisory device. Alternatively, recomputation of a voting constituency may be initiated by the supervisory device (e.g., a policy engine may determine that the constituency used by a given node is out of date).

As will be appreciated, any number of experts may be used to evaluate the ground truth regarding a detected attack. In one embodiment, information surrounding a potential attack may be reported to a set of experts that either load-share evaluation of the observation data or may cross-check their findings. Such a distributed, human-based computation of constituencies may allow for increased scalability and/or a more accurate determination of voting classifiers.

Figure 10:
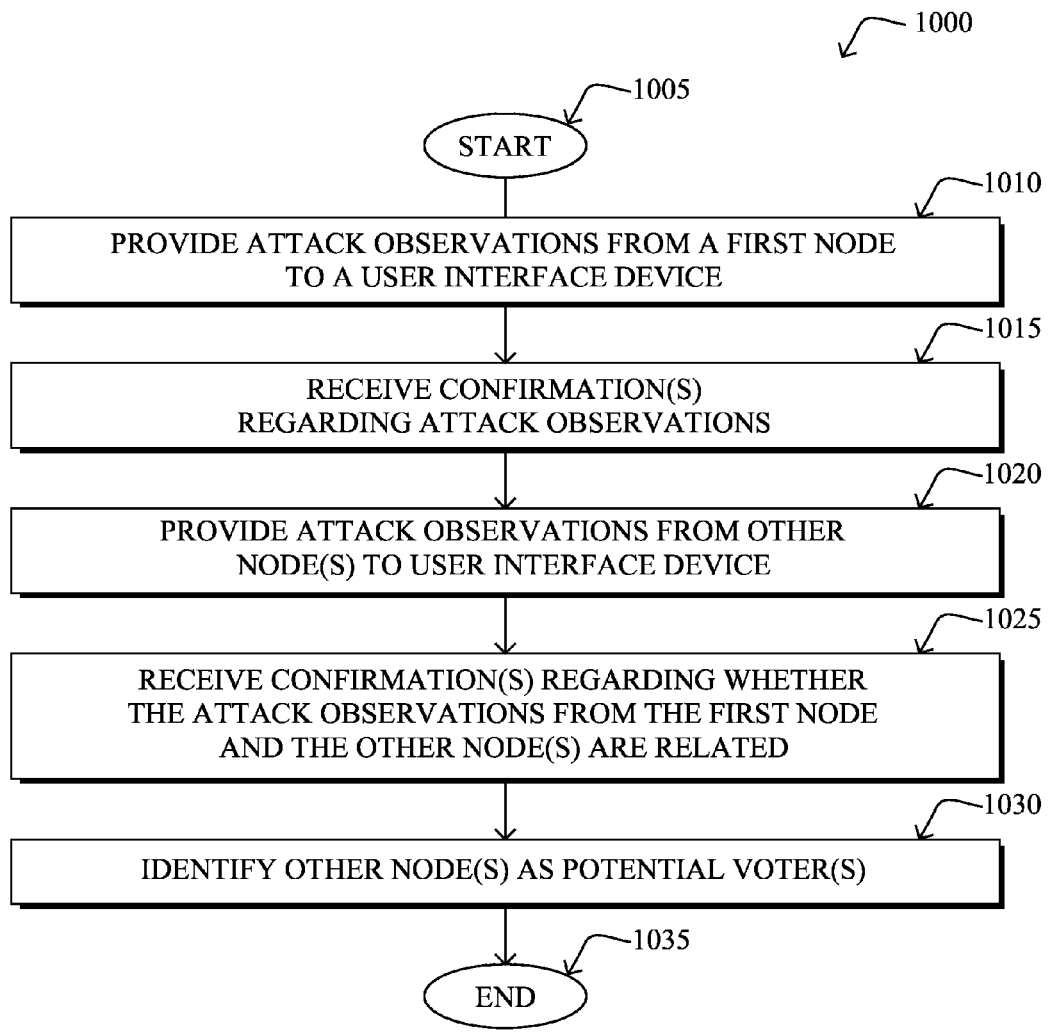
FIG. 10 illustrates an example simplified procedure for identifying potential voters.

FIG. 10 illustrates an example simplified procedure for identifying potential voters in a network in accordance with one or more embodiments described herein. In various embodiments, procedure 1000 may be performed by a supervisory network device, such as an NMS, router, or the like. The procedure 1000 may start at step 1005, and continues to step 1010, where, as described in greater detail above, attack observations are provided from a first node to a user interface device. In general, the attack observations may include any or all information that was used by the first node to detect a potential attack. For example, the attack observations may include, but are not limited to, node performance data (e.g., processor usage, queue lengths, etc.), traffic metrics (e.g., traffic volume, bandwidth consumed, number of requests, etc.) link metrics (e.g., dropped packets, jitter, etc.), or any other information that may be used to identify the presence of an attack. In various embodiments, the attack observations may correspond to sets of feature vectors that were used as input by a machine learning classifier on the first node to detect the potential attack. In addition, the attack observations may be received in response to the first node determining that the first node is not currently participating in a voting-based attack detection mechanism (e.g., the first node does not currently have a constituency of voters).

As described in greater detail above, the attack observations may be provided to the user interface via a GUI. Such a GUI may, in some embodiments, ask one or more human experts to label the attack observations as either indicative of an attack or not indicative of an attack. In other words, the user interface may receive input from the user that either confirms or denies the presence of the detected attack based on the attack observations from the first node.

At step 1015, confirmations regarding the attack observations from the first node are received via the user interface device, as highlighted above. For example, the device may receive a set of labels that were applied to the attack observations by one or more experts/users. In other words, a given label may confirm that a particular observation indicates that the attack was detected correctly. In one embodiment, the received confirmation may include a confirmation that the attack detected by the first node was correct (e.g., a tally of the labels provided by the one or more experts). In another embodiment, an indication may be received that a particular expert was unable to evaluate the attack observations. In yet another embodiment, a query may be sent to the first node for additional attack observations, such as in the case where the first node provided a sampled set of attack observations to the supervisory device.

At step 1020, attack observations from one or more other nodes are provided to the user interface device, as described in greater detail above. In some cases, the attack observations from the one or more other nodes may be retrieved from the one or more other nodes by specifying a timeframe related to the attack. In various embodiments, the one or more other nodes may be selected based on their proximity to the first node, based on input received via the user interface device (e.g., the user may manually select another node for evaluation), based on a policy engine determining that another node is an eligible voter for the first node, based on the other node detecting an attack concurrently with the attack detected by the first node, or for any other reason.

At step 1025, confirmations are received from the user interface device that the attack observations from the first node and the one or more other nodes are related, as detailed above. Such confirmations may correspond to, for example, labels received by the user interface device from the expert that confirm that the attack observations from the one or more other nodes are indeed related to the attack detected by the first node.

At step 1030, the one or more other nodes are identified as potential voters for the first node, as described in greater detail above. In particular, a node may be identified as potential voter based on an expert's assessment that the node was able to observe and detect the attack that was also detected by the first node. In some embodiments, how well the other node was able to detect the attack on the first node may be quantified based on the confirmations received in step 1025 (e.g., based on how well the labels applied by the other node match those applied by the expert). Such information may be used, in some embodiments, to determine an optimal voting strategy for the first node. Procedure 1000 then ends at step 1035.

Figure 11:
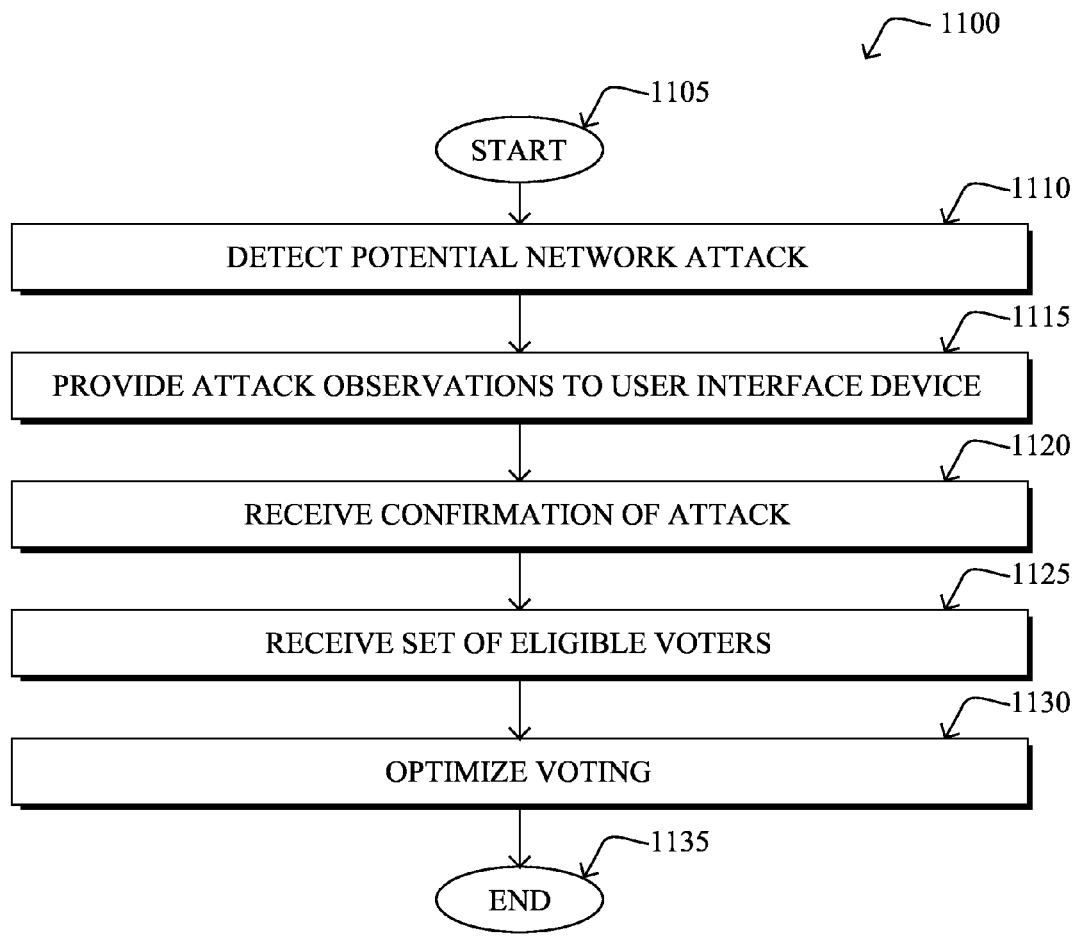
FIG. 11 illustrates an example simplified procedure for optimizing a vote.

FIG. 11 illustrates an example simplified procedure for identifying potential voters in a network in accordance with one or more embodiments described herein. In various embodiments, procedure 1100 may be performed by any network device (e.g., a first network device) configured to detect a potential network attack. The procedure 1100 may start at step 1105, and continues to step 1110, where, as described in greater detail above, a potential network attack may be detected by the device. In various embodiments, the network device may detect the potential network attack by executing a machine learning classifier. In general, the classifier may operate by applying a label from a set of labels (e.g., "Attack" or "No Attack") to feature vectors determined by the device. Such features may, for example, correspond to observations made by the device regarding the state of the device (e.g., the available resources at the device), the traffic associated with the device (e.g., amount of traffic, types of traffic, etc.), and/or any network links (e.g., available bandwidth, etc.) connected to the device, and were used by the device to detect the attack.

At step 1115, the attack observations used by the network device are provided to a user interface device, as highlighted above. In various cases, the network device that detected the attack may provide the observations to a user interface device for review either directly or via one or more supervisory devices. For example, the network device may provide the attack observations used to detect the attack to an NMS or network controller that forwards the attack observations to a GUI on the user interface device.

At step 1120, a confirmation is received by the network device that the attack detected in step 1110 was confirmed, as detailed above. In particular, the first network device may receive a confirmation via the user interface device that confirms that a particular attack observation by the first network device indicates the presence of the attack. In other words, the device that detected the attack may receive confirmation from one or more users/experts that validate the detected attack.

At step 1125, a set of one or more eligible voters is received, as described in greater detail above. In some embodiments, the set of eligible voters is received from a supervisory device that determines eligibility of voters based on network policies, compatibility between classifiers, or other such information. For example, when a single dataset approach is used for voting, an eligible voter may be selected based on its ability to detect an attack using the observations from the target node. In some embodiments, the set of eligible nodes may be based in part on confirmations received via a user interface device that the one or more eligible nodes also observed the attack. Conversely, in some cases, the network device may itself be queried for observation data regarding an attack detected by one of the other nodes/devices.

At step 1130, the voting strategy used by the network device to confirm the detection of an attack may be optimized, as highlighted above. Notably, optimization of the voting mechanism may be performed at the network device itself or at the supervisory device. In various embodiments, the ability of different sets of eligible voters to correctly identify an attack may be represented as an objective function. In some cases, the objective function may also evaluate various voting thresholds among the evaluated sets of voters. For example, the objective function may quantify the number of times that at least three voters out of a set of five were able to correctly detect an attack given a set of input features. Voting optimization may thus be performed by finding a subset of voters and minimal voting threshold that maximizes the number of times the combination of voters arrived at the correct conclusion. In implementations in which a single dataset voting approach is used, the observations confirmed in step 1120 by one or more users/experts may be provided to the eligible voters in step 1125, to assess whether the eligible voters are able to correctly detect the attack. Alternatively, in an independent assessment voting approach, performance metrics may be included in the set of eligible voters that were received in step 1125. Such metrics may be based, for example, on an assessment by one or more users/experts on the independent observations made by the eligible voters surrounding the attack. Once the optimized voting strategy has been determined, the network device may then implement the corresponding voting strategy to verify whether an attack was successfully detected. Procedure 1100 then ends at step 1135.

It should be noted that while certain steps within procedures 1000-1100 may be optional as described above, the steps shown in FIGS. 10-11 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1000-1100 are described separately, certain steps from each procedure may be incorporated into each other procedure, and the procedures are not meant to be mutually exclusive.

The techniques described herein, therefore, provide for the optimization of a voting process in which different nodes in a network vote to confirm a detected network attack. In particular, one or more experts may be leveraged provide a ground truth through which potential voting nodes may be evaluated. Notably, selecting an optimal set of peers for participating in a vote may improve the performance of the local attack detection (e.g., by helping to eliminate false positives). This, in turn, may reduce the number of alarms that are sent to a supervisory device, potentially improving resource utilization and system usability (e.g., so that a network administrator does not receive too many false alarms). In addition, the techniques herein provide for the establishment of a ground truth without the need for pre-labeled data such as by simulating network attacks, allowing for easier deployments.

While there have been shown and described illustrative embodiments that provide for validating the detection of a network attack, it is to be understood that various other adaptations and modifications may be made within the spirit and scope of the embodiments herein. For example, while the techniques herein are described primarily with respect to attack-detection classifiers, the techniques herein may also be used to vote on different classification labels that are not related to attack detection (e.g., labels that relate to other network conditions). In addition, while the techniques herein are described primarily in the context of an LLN, the techniques herein may be applied more generally to any form of computer network, such as an enterprise network.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   providing, by a supervisory computer network device, computer network attack observations from a first computer network device in a computer network to a user interface device regarding a potential computer network attack detected by the first computer network device;
   receiving, at the supervisory computer network device, a confirmation from the user interface device that confirms that a particular computer network attack observation from the first computer network device indicates that the potential computer network attack was detected correctly by the first computer network device;
   in response to receiving the confirmation that a potential computer network attack was detected correctly, providing, by the supervisory computer network device, computer network attack observations from one or more other computer network devices in the computer network to the user interface device;
receiving, at the supervisory computer network device, one or more confirmations from the user interface device that confirms that the computer network attack observations from the one or more other computer network devices are related to the computer network attack observations from the first computer network device; and
identifying, by the supervisory computer network device, the one or more other computer network devices to act as potential voters for the first computer network device in a voting-based network attack detection mechanism based on the computer network attack observations from the first computer network device and the one or more other computer network devices being related to each other.

2. The method as in claim 1, wherein the computer network attack observations from the first computer network device are provided to the user interface device in response to the first computer network device detecting the potential computer network attack using a machine learning classifier.

3. The method as in claim 2, wherein the computer network attack observations by the first computer network device are provided to the user interface device based in part on a determination that the first computer network device did not use a vote to detect the potential computer network attack.

4. The method as in claim 1, further comprising:
providing a request to the one or more other computer network devices for the computer network attack observations by the one or more other computer network devices.

5. The method as in claim 1, wherein the first computer network device determines an optimized voting strategy based on the identified one or more potential voters.

6. A method comprising:
detecting, at a computer network device, a potential computer network attack based on observations by the computer network device regarding the computer network;
providing, by the computer network device, the observations to a user interface device;
receiving, at the computer network device, a confirmation via the user interface device that the computer network attack was detected correctly; and
receiving, at the computer network device, data indicative of a set of one or more other computer network devices to act as eligible voters for the computer network device, wherein the eligible voters are identified by a supervisory computer network device when computer network attack observations from the one or more other computer network devices are related to the computer network attack observations of the computer network device; and
optimizing, by the computer network device, a voting-based attack detection mechanism using the set of one or more eligible voters.

7. The method as in claim 6, wherein optimizing the voting-based attack detection mechanism comprises:
selecting an optimal set of voters from among the set of one or more eligible voters; and
determining an optimal voting threshold for the set of voters to confirm a computer network attack detected by the computer network device.

8. The method as in claim 6, wherein the set of one or more other computer network devices is selected based on a determination that the one or more computer network devices were able to observe the computer network attack.

9. The method as in claim 8, wherein the one or more other computer network devices were determined to be able to observe the computer network attack by providing observations from the one or more computer network devices to the user interface device.

10. The method as in claim 6, further comprising:
receiving a request from the user interface device for observations regarding a computer network attack detected by a second computer network device; and
providing the requested observations to the user interface device.

11. The method as in claim 6, wherein the set of one or more other computer network devices is selected based on a determination that the eligible voters are able to detect the computer network attack using the observations from the computer network device.

12. An apparatus, comprising:
one or more network interfaces to communicate with a computer network;
a processor coupled to the network interfaces and adapted to execute one or more processes; and
a memory configured to store a process executable by the processor, the process when executed operable to:
provide computer network attack observations from a first computer network device in the computer network to a user interface device regarding a potential computer network attack detected by the first computer network device;
receive a confirmation from the user interface device that confirms that a particular computer attack observation from the first computer network device indicates that the potential computer network attack was detected correctly by the first computer network device;
in response to receiving the confirmation that a potential computer network attack was detected correctly, provide computer network attack observations from one or more other computer network devices in the computer network to the user interface device;
receive one or more confirmations from the user interface device that confirms that the computer network attack observations from the one or more other computer network devices are related to the computer network attack observations from the first computer network device; and
identify the one or more other computer network devices as potential voters for the first computer network device in a voting-based network attack detection mechanism based on the computer network attack observations from the first computer network device and the one or more other computer network devices being related to each other,
wherein the apparatus is a supervisory computer network device.

13. The apparatus as in claim 12, wherein the computer network attack observations from the first computer network device are provided to the user interface device in response to the first computer network device detecting the potential computer network attack using a machine learning classifier.

14. The apparatus as in claim 13, wherein the computer network attack observations by the first computer network device are provided to the user interface device based in part on a determination that the first computer network device did not use a vote to detect the potential computer network attack.

15. The apparatus as in claim 12, wherein the process when executed is further operable to:
provide a request to the one or more other computer network devices for the computer network attack observations by the one or more other computer network devices.

16. The apparatus as in claim 12, wherein the first computer network device determines an optimized voting strategy based on the identified one or more potential voters.

17. An apparatus, comprising:
one or more network interfaces to communicate with a computer network;
a processor coupled to the network interfaces and adapted to execute one or more processes; and
a memory configured to store a process executable by the processor, the process when executed operable to:
detect a potential computer network attack based on observations regarding the computer network;
provide the observations to a user interface device;
receive a confirmation via the user interface device that the computer network attack was detected correctly;
receive data indicative of a set of one or more other computer network devices to act as eligible voters for the computer network device, wherein the eligible voters are identified by a supervisory computer network device when computer network attack observations from the one or more other computer network devices are related to the computer network attack observations of the computer network device; and
optimize a voting-based attack detection mechanism using the set of one or more eligible voters.

18. The apparatus as in claim 17, wherein the voting-based attack detection mechanism is optimized by:
selecting an optimal set of voters from among the set of one or more eligible voters; and
determining an optimal voting threshold for the set of voters to confirm a computer network attack detected by the computer network device.

19. The apparatus as in claim 17, wherein the set of one or more other computer network devices is selected based on a determination that the one or more network devices were able to observe the computer network attack.

20. The apparatus as in claim 19, wherein the one or more other computer network devices were determined to be able to observe the computer network attack by providing observations from the one or more computer network devices to the user interface device.

21. The apparatus as in claim 17, wherein the process when executed is further operable to:
receive a request from the user interface device for observations regarding a computer network attack detected by a second computer network device; and
provide the requested observations to the user interface device.

22. The apparatus as in claim 17, wherein the set of one or more other computer network devices is selected based on a determination that the eligible voters are able to detect the computer network attack using the observations from the computer network device.

23. A tangible, non-transitory, computer-readable media having software encoded thereon, the software when executed by a processor operable to:
provide computer network attack observations from a first computer network device in a computer network to a user interface device regarding a potential computer network attack detected by the first computer network device;
receive a confirmation from the user interface device that confirms that a particular computer network attack observation from the first computer network device indicates that the potential computer network attack was detected correctly by the first computer network device;
in response to receiving the confirmation that a potential computer network attack was detected correctly, provide computer network attack observations from one or more other computer network devices in the computer network to the user interface device;
receive one or more confirmations from the user interface device that confirms that the computer network attack observations from the one or more other computer network devices are related to the computer network attack observations from the first computer network device; and
identify the one or more other computer network devices as potential voters for the first computer network device in a voting-based network attack detection mechanism based on the computer network attack observations from the first computer network device and the one or more other computer network devices being related to each other.

24. A tangible, non-transitory, computer-readable media having software encoded thereon, the software when executed by a processor operable to:
detect a potential computer network attack based on observations regarding a computer network;
provide the observations to a user interface device;
receive a confirmation via the user interface device that computer network attack was detected correctly;
receive data indicative of a set of one or more other computer network devices to act as eligible voters, wherein the eligible voters are identified by a supervisory computer network device when computer network attack observations from the one or more other computer network devices are related to the computer network attack observations of the computer network device; and
optimize a voting-based attack detection mechanism using the set of one or more eligible voters.

* * * * *